(12) United States Patent
Murdoch et al.

(10) Patent No.: US 11,729,157 B2
(45) Date of Patent: Aug. 15, 2023

(54) BOOTSTRAPPING TRUST IN DECENTRALIZED IDENTIFIERS

(71) Applicant: Microsoft Technology Licensing, LLC, Redmond, WA (US)

(72) Inventors: Brandon Murdoch, Reading (GB); Ankur Patel, Sammamish, WA (US); Sydney Morton, Seattle, WA (US); Andreas Mikolajewski, Leimen (DE); Daniel Godbout, Kirkland, WA (US); Nithya Ganesh, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 253 days.

(21) Appl. No.: 17/331,494

(22) Filed: May 26, 2021

(65) Prior Publication Data
US 2022/0385645 A1 Dec. 1, 2022

(51) Int. Cl.
*H04L 9/40* (2022.01)
*G06F 16/23* (2019.01)
*H04L 61/4511* (2022.01)
*H04L 9/30* (2006.01)
*H04L 9/00* (2022.01)

(52) U.S. Cl.
CPC .......... *H04L 63/08* (2013.01); *G06F 16/2379* (2019.01); *H04L 9/30* (2013.01); *H04L 61/4511* (2022.05); *H04L 9/50* (2022.05)

(58) Field of Classification Search
CPC ....... H04L 63/08; H04L 9/30; H04L 61/4511; H04L 9/50; H04L 63/1433; H04L 63/0884; G06F 16/2379
See application file for complete search history.

(56) References Cited

U.S. PATENT DOCUMENTS

| | | | |
|---|---|---|---|
| 7,454,413 B2 * | 11/2008 | Lakshminarayanan | G06F 16/832 |
| 10,235,357 B2 * | 3/2019 | Murphy | G06F 40/30 |
| 10,250,677 B1 * | 4/2019 | Aizikovich | H04L 67/1029 |
| 10,607,042 B1 * | 3/2020 | Dasgupta | G06F 40/253 |
| 11,025,435 B2 * | 6/2021 | Li | H04L 9/3236 |
| 11,025,626 B1 * | 6/2021 | Todd | H04L 9/3297 |

(Continued)

OTHER PUBLICATIONS

Mayrhofer, et al., "The Decentralized Identifier (DID) in the DNS draft-mayrhofer-did-dns-04", In the Network Working Group, Internet Draft, Sep. 9, 2020, 8 Pages.

(Continued)

*Primary Examiner* — Aravind K Moorthy
(74) *Attorney, Agent, or Firm* — Workman Nydegger

(57) ABSTRACT

Bootstrapping trust in decentralized identifiers (DIDs) includes in response to receiving a request from an entity associated with a DID in a decentralized system, obtaining a DID document associated with the DID, and extracting a linked domain that is linked to the DID from the DID document. The DID document contains data associated with the DID that is recorded on the distributed ledger. The request contains the DID and data associated with the DID. Metadata associated with the linked domain is then retrieved from a domain name system (DNS). Based on the metadata associated with the linked domain and the data associated with the DID contained in the request, a trust score, indicating trustworthiness of the DID, is generated.

20 Claims, 12 Drawing Sheets

(56) References Cited

U.S. PATENT DOCUMENTS

| | | | | |
|---|---|---|---|---|
| 11,038,670 B2* | 6/2021 | Li | ............................. | H04L 9/30 |
| 11,038,883 B2* | 6/2021 | Yang | ....................... | G06F 21/45 |
| 11,082,233 B2* | 8/2021 | Yang | ..................... | H04L 9/3234 |
| 11,163,942 B1* | 11/2021 | Fatma | .................... | G06F 40/279 |
| 11,165,576 B2* | 11/2021 | Liu | ........................ | H04L 63/126 |
| 11,212,296 B2* | 12/2021 | Oberhauser | ........... | H04L 63/126 |
| 11,277,268 B2* | 3/2022 | Yang | ......................... | H04L 9/30 |
| 11,381,567 B2* | 7/2022 | Murdoch | .............. | H04L 9/3239 |
| 11,411,959 B2* | 8/2022 | Murdoch | .............. | H04L 63/102 |
| 2006/0041564 A1* | 2/2006 | Jain | ........................ | G06F 16/907 |
| 2009/0112841 A1* | 4/2009 | Devarakonda | ........... | G06F 16/36 |
| | | | | 707/999.005 |
| 2010/0042610 A1* | 2/2010 | Lakhani | ................ | G06F 16/907 |
| | | | | 707/E17.014 |
| 2012/0102033 A1* | 4/2012 | Sarshar | ................. | G06F 16/683 |
| | | | | 707/E17.084 |
| 2012/0221583 A1* | 8/2012 | Kulack | ............... | G06F 16/2291 |
| | | | | 707/E17.054 |
| 2013/0080319 A1* | 3/2013 | Greenstone | ........ | G06Q 30/0222 |
| | | | | 705/39 |
| 2015/0066895 A1* | 3/2015 | Komissarchik | ...... | G06V 30/413 |
| | | | | 707/709 |
| 2015/0356170 A1* | 12/2015 | Allen | .................. | G06F 16/3329 |
| | | | | 707/725 |
| 2016/0371255 A1* | 12/2016 | Desai | .................... | G06F 40/151 |
| 2019/0222424 A1* | 7/2019 | Lindemann | ........... | H04L 9/3231 |
| 2019/0229914 A1 | 7/2019 | Patel et al. | | |
| 2020/0027445 A1* | 1/2020 | Raghunathan | .......... | G10L 15/32 |
| 2020/0036707 A1* | 1/2020 | Callahan | ................. | H04L 67/53 |
| 2020/0234183 A1* | 7/2020 | Ghatage | ................ | G06N 3/044 |
| 2020/0252372 A1* | 8/2020 | Bilsten | ............... | H04L 61/3025 |
| 2020/0272619 A1* | 8/2020 | Alferov | ................. | H04L 9/0643 |
| 2021/0012103 A1* | 1/2021 | Bassu | .................. | G06F 16/288 |
| 2021/0119807 A1* | 4/2021 | Chen | ..................... | H04L 9/3242 |
| 2021/0126769 A1* | 4/2021 | Soundararajan | ...... | H04L 9/3239 |
| 2021/0232613 A1* | 7/2021 | Raval Contractor | .... | G06N 5/02 |
| 2021/0334664 A1* | 10/2021 | Li | .......................... | G06V 20/20 |
| 2021/0385216 A1* | 12/2021 | Khalil | .................. | H04L 9/3239 |
| 2022/0092095 A1* | 3/2022 | Shukla | ................. | G06F 16/334 |

OTHER PUBLICATIONS

"International Search Report and Written Opinion Issued in PCT Application No. PCT/US22/027747", dated Aug. 22, 2022, 14 Pages.

* cited by examiner

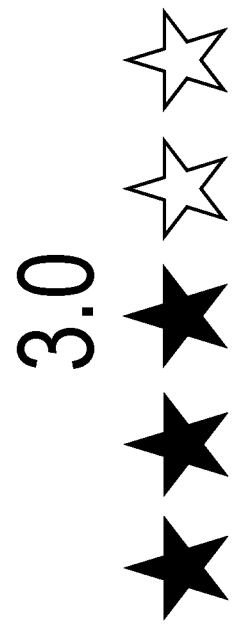
FIG. 7A
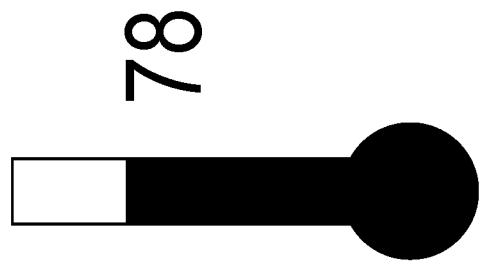
FIG. 7B
FIG. 7C
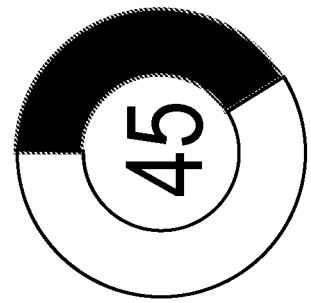
FIG. 7D

```
800
{
  "id": "did:example:123ABC",                                      ⟵ 810
  "authentication": [{
        "id": "did:example:123ABC#keys-1",
        "type": "Ed25519VerificationKey2018",
        "controller": "did:example:123ABC",
        "publicKeyBase58":"xxxxxxxxxxxxxxxxxxxx"
   820
  "service": [{
        "id":"did:example: 123ABC#linked-domain",
        "type": "LinkedDomains",
        "serviceEndpoint":
        "https://example.contoso.com"
   830    }]
       832       . . .
}
```

Domain Name: contoso.com
Creation Date: 1990-05-01T21:00:00-0700
Registrar Registration Expiration Date: 2023-05-02T00:00:00-0700
Registrant Name: Domain Administrator
Registrant Organization: Contoso Corporation
Registrant Street: 123 ABC Street,
Registrant City: Redmond
Registrant State/Province: WA
Registrant Postal Code: 98xxx
Registrant Country: US
Registrant Phone: +1.425xxxxxxx
Registrant Phone Ext:
Registrant Fax: +1.425xxxxxx

BOOTSTRAPPING TRUST IN DECENTRALIZED IDENTIFIERS

BACKGROUND OF THE INVENTION

Most of the currently used documents or records that prove identity are issued by centralized organizations, such as governments, schools, employers, or other service centers or regulatory organizations. These organizations often maintain every member's identity in a centralized identity management system. A centralized identity management system is a centralized information system used for organizations to manage the issued identifiers, their authentication, authorization, roles, and privileges. Centralized identity management systems have been deemed as secure since they often use professionally maintained hardware and software. Typically, the identity issuing organization sets the terms and requirements for registering people with the organization. Finally, when a party needs to verify another party's identity, the verifying party often needs to go through the centralized identity management system to obtain information verifying and/or authenticating the other party's identity.

Decentralized Identifiers (DIDs) are a new type of identifier, which are independent of any centralized registry, identity provider, or certificate authority. Distributed ledger technology (such as blockchain) provides the opportunity to use decentralized identifiers fully. Distributed ledger technology uses globally distributed ledgers to record transactions between two or more parties in a verifiable way. Once a transaction is recorded, the data in the section of the ledger cannot be altered retroactively without the alteration of all subsequent sections of the ledger, which provides a fairly secure platform. In such a decentralized environment, each owner of DID generally has control over his/her own data using his/her DID.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

This Summary is provided to introduce a selection of concepts in a simplified form that is further described below in the Detailed Description. This Summary is not intended to identify key features or essential features of the claimed subject matter, nor is it intended to be used as an aid in determining the scope of the claimed subject matter.

Embodiments disclosed herein are related to computing systems, methods, and computer program products for bootstrapping trust in decentralized identifiers (DIDs) in a decentralized system. The decentralized system uses one or more distributed ledgers to authenticate or authorize transactions associated with DIDs. In response to receiving a request from an entity associated with a DID, a computing system is configured to obtain a DID document associated with the DID. The DID document contains data associated with the DID that is recorded on the distributed ledger. In some embodiments, the computing system is associated with a user agent or a DID management module of a user. The DID management module communicates with a DID resolver, which traverses the one or more distributed ledger to obtain data associated with the DID and generate the DID document based on the obtained data. In such a case, the computing system receives the DID document from the DID resolver. In some embodiments, the computing system includes a DID resolver, which traverses the one or more distributed ledger itself to obtain data associated with the DID and generate the DID document based on the obtained data.

The computing system is further configured to extract a linked domain from the DID document and retrieve metadata associated with the linked domain from a domain name system (DNS). Notably, the request from the entity contains not only the DID but also data associated with the DID. The computing system can then generate a trust score indicating a level of trustworthiness of the DID based on the metadata associated with the linked domain and the data associated with the DID that is contained in the request.

In some embodiments, the computing system is further configured to visualize the trust score in a graphical user interface (GUI). In some embodiments, the computing system is further configured to recommend whether the request should be accepted or rejected based on the trust score, or automatically accept or reject the request based on the trust score. In some embodiments, recommending whether the request should be accepted or rejected, or automatically accepting or rejecting the request is further based on one or more characters of the request. The one or more characters of the request includes at least (1) a type of data requested by the request, or (2) a type of service that the entity is to provide.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not, therefore, to be considered to be limiting in scope, embodiments will be described and explained with additional specificity and details through the use of the accompanying drawings in which:

FIGS. 7A-7D illustrate a few examples of graphical user interfaces that visualizes trust scores;

FIG. 8 illustrates an example of a DID document that includes data associated with a linked domain;

FIG. 9 illustrates an example of a set of metadata associated with a linked domain;

DETAILED DESCRIPTION

Figure 1:
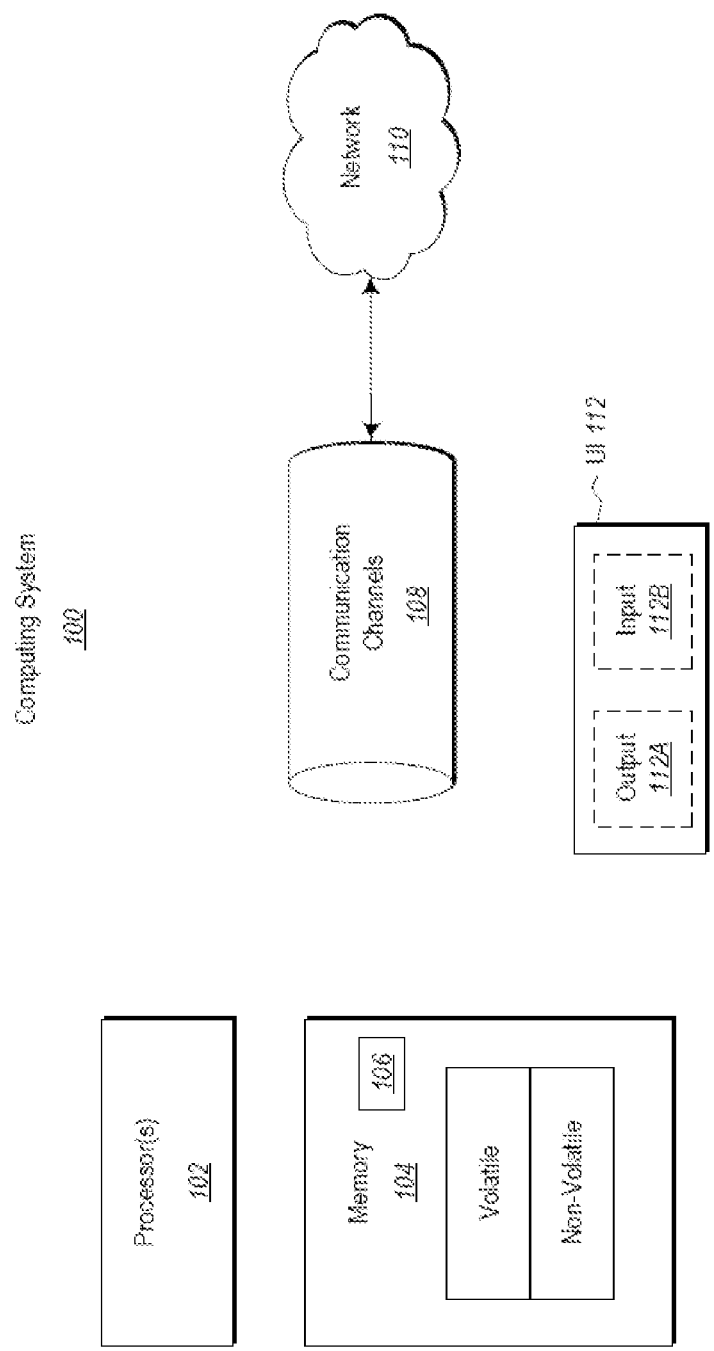
FIG. 1 illustrates an example computing system in which the principles described herein may be employed.

Embodiments disclosed herein are related to computing systems, methods, and computer program products for bootstrapping trust in decentralized identifiers (DIDs) in a decentralized system. The decentralized system uses one or more distributed ledgers to authenticate or authorize transactions associated with DIDs. In response to receiving a request from an entity associated with a DID, a computing system is configured to obtain a DID document associated with the DID. The DID document contains data associated with the DID that is recorded on the distributed ledger. In some embodiments, the computing system is associated with a user agent or a DID management module of a user. The DID management module communicates with a DID resolver, which traverses the one or more distributed ledgers to obtain data associated with the DID and generate the DID document based on the obtained data. In such a case, the computing system receives the DID document from the DID resolver. In some embodiments, the computing system includes a DID resolver, which traverses the one or more distributed ledger itself to obtain data associated with the DID and generate the DID document based on the obtained data.

The computing system is further configured to extract a linked domain from the DID document and retrieve metadata associated with the linked domain from a domain name system (DNS). Notably, the request from the entity contains not only the DID but also data associated with the DID. The computing system can then generate a trust score indicating a level of trustworthiness of the DID based on the metadata associated with the linked domain and the data associated with the DID that is contained in the request.

In some embodiments, the computing system is further configured to visualize the trust score in a graphical user interface (GUI). In some embodiments, the computing system is further configured to recommend whether the request should be accepted or rejected based on the trust score, or automatically accept or reject the request based on the trust score. In some embodiments, recommending whether the request should be accepted or rejected, or automatically accepting or rejecting the request is further based on one or more characters of the request. The one or more characters of the request include at least (1) a type of data requested by the request, or (2) a type of service that the entity is to provide.

In some embodiments, the computing system is configured to automatically accept the request when the trust score is greater than a first threshold, and/or automatically reject the request when the trust score is lower than a second threshold that is higher than the first threshold. In some embodiments, when the trust score is between the first threshold and the second threshold, the computing system is further configured to generate a notification, notifying a user of the trust score, and/or request the user to manually select whether the request is to be accepted or rejected.

In some embodiments, generating the trust score includes extracting one or more first values of one or more first attributes from metadata associated with the linked domain, and extracting one or more second values of one or more second attributes from data associated with the DID (contained in the request). The one or more first values of the one or more first attributes are then compared with the one or more second values of the one or more second attributes to determine one or more scores for one or more scoring criteria. In some embodiments, a weight is assigned for each of the one or more scoring criteria, and an overall trust score is computed based on weighted one or more scores for the one or more scoring criteria.

In some embodiments, the one or more first attributes include at least one of (1) a creation date of the linked domain, (2) an organization name of a registrant of the linked domain, (3) an address of the registrant of the linked domain, (4) a phone number of the registrant of the linked domain, and/or (5) a fax number of the registrant of the linked domain. In some embodiments, the one or more second attributes include at least one of (1) a name of the entity, (2) an address of the entity, (3) a phone number of the entity, (4) a fax number of the entity, (5) an email address of the entity, or (6) a creation date of the DID associated with the entity.

In some embodiment, the DID associated with the entity is a first DID. The computing system is associated with a second DID, or a user of the computing system is associated with a second DID. For example, the computing system may be a mobile device of the user, and a user agent (e.g., a DID management module, or a wallet app) is installed on the mobile device.

Because the principles described herein may be performed in the context of a computing system, some introductory discussion of a computing system will be described with respect to FIG. 1. Then, this description will return to the principles of the DID platform with respect to the remaining figures.

Computing systems are now increasingly taking a wide variety of forms. Computing systems may, for example, be handheld devices, appliances, laptop computers, desktop computers, mainframes, distributed computing systems, data centers, or even devices that have not conventionally been considered a computing system, such as wearables (e.g., glasses). In this description and in the claims, the term "computing system" is defined broadly as including any device or system (or a combination thereof) that includes at least one physical and tangible processor, and a physical and tangible memory capable of having thereon computer-executable instructions that may be executed by a processor. The memory may take any form and may depend on the nature and form of the computing system. A computing system may be distributed over a network environment and may include multiple constituent computing systems.

As illustrated in FIG. 1, in its most basic configuration, a computing system 100 typically includes at least one processing unit 102 and memory 104. The processing unit 102 may include a general-purpose processor and may also include a field-programmable gate array (FPGA), an application-specific integrated circuit (ASIC), or any other specialized circuit. The memory 104 may be physical system memory, which may be volatile, non-volatile, or some combination of the two. The term "memory" may also be used herein to refer to non-volatile mass storage such as physical hardware storage devices. If the computing system is distributed, the processing, memory and/or storage capability may be distributed as well.

The computing system 100 also has thereon multiple structures often referred to as an "executable component." For instance, the memory 104 of the computing system 100 is illustrated as including executable component 106. The term "executable component" is the name for a structure that is well understood to one of the ordinary skills in the art in the field of computing as being a structure that can be software, hardware, or a combination thereof. For instance, when implemented in software, one of ordinary skill in the art would understand that the structure of an executable component may include software objects, routines, methods, and so forth that may be executed on the computing system, whether such an executable component exists in the heap of a computing system, or whether the executable component exists on computer-readable hardware storage devices.

In such a case, one of ordinary skill in the art will recognize that the structure of the executable component exists on a computer-readable medium such that, when interpreted by one or more processors of a computing system (e.g., by a processor thread), the computing system is caused to perform a function. Such structure may be computer-readable directly by the processors (as is the case if the executable component were binary). Alternatively, the structure may be structured to be interpretable and/or compiled (whether in a single stage or in multiple stages) so as to generate such binary that is directly interpretable by the processors. Such an understanding of example structures of an executable component is well within the understanding of one of ordinary skill in the art of computing when using the term "executable component."

The term "executable component" is also well understood by one of ordinary skill as including structures, such as hard coded or hard-wired logic gates, that are implemented exclusively or near-exclusively in hardware, such as within a field-programmable gate array (FPGA), an application-specific integrated circuit (ASIC), or any other specialized circuit. Accordingly, the term "executable component" is a term for a structure that is well understood by those of ordinary skill in the art of computing, whether implemented in software, hardware, or a combination. In this description, the terms "component", "agent", "manager", "service", "engine", "module", "virtual machine" or the like may also be used. As used in this description and in the case, these terms (whether expressed with or without a modifying clause) are also intended to be synonymous with the term "executable component", and thus also have a structure that is well understood by those of ordinary skill in the art of computing.

In the description that follows, embodiments are described with reference to acts that are performed by one or more computing systems. If such acts are implemented in software, one or more processors (of the associated computing system that performs the act) direct the operation of the computing system in response to having executed computer-executable instructions that constitute an executable component. For example, such computer-executable instructions may be embodied on one or more computer-readable hardware storage devices that form a computer program product. An example of such an operation involves the manipulation of data. If such acts are implemented exclusively or near-exclusively in hardware, such as within an FPGA or an ASIC, the computer-executable instructions may be hard coded or hard-wired logic gates. The computer-executable instructions (and the manipulated data) may be stored in the memory 104 of the computing system 100. Computing system 100 may also contain communication channels 108 that allow the computing system 100 to communicate with other computing systems over, for example, network 110.

While not all computing systems require a user interface, in some embodiments, the computing system 100 includes a user interface system 112 for use in interfacing with a user. The user interface system 112 may include output mechanisms 112A as well as input mechanisms 112B. The principles described herein are not limited to the precise output mechanisms 112A or input mechanisms 112B as such will depend on the nature of the device. However, output mechanisms 112A might include, for instance, speakers, displays, tactile output, holograms, and so forth. Examples of input mechanisms 112B might include, for instance, microphones, touchscreens, holograms, cameras, keyboards, mouse of other pointer input, sensors of any type, and so forth.

Embodiments described herein may comprise or utilize a special purpose or general-purpose computing system including computer hardware, such as, for example, one or more processors and system memory, as discussed in greater detail below. Embodiments described herein also include physical and other computer-readable hardware storage devices for carrying or storing computer-executable instructions and/or data structures. Such computer-readable hardware storage devices can be any available media that can be accessed by a general-purpose or special-purpose computing system. Computer-readable hardware storage devices that store computer-executable instructions are physical hardware storage devices. Computer-readable hardware storage devices that carry computer-executable instructions are volatile hardware storage devices. Thus, by way of example, and not limitation, embodiments of the invention can comprise at least two distinctly different kinds of computer-readable hardware storage devices: persistent storage devices and volatile storage devices.

Computer-readable hardware storage devices include RAM, ROM, EEPROM, CD-ROM, or other optical disk storage, magnetic disk storage, or other magnetic storage devices, or any other physical and tangible storage medium which can be used to store desired program code means in the form of computer-executable instructions or data structures and which can be accessed by a general-purpose or special purpose computing system.

A "network" is defined as one or more data links that enable the transport of electronic data between computing systems and/or modules and/or other electronic devices. When information is transferred or provided over a network or another communications connection (either hard-wired, wireless, or a combination of hard-wired or wireless) to a computing system, the computing system properly views the connection as a transmission medium. Transmissions media can include a network and/or data links that can be used to carry desired program code means in the form of computer-executable instructions or data structures and which can be accessed by a general-purpose or special-purpose computing system. Combinations of the above should also be included within the scope of computer-readable hardware storage devices.

Further, upon reaching various computing system components, program code means in the form of computer-executable instructions or data structures can be transferred automatically from volatile hardware storage devices to hardware storage devices (or vice versa). For example, computer-executable instructions or data structures received over a network or data link can be buffered in RANI within a network interface module (e.g., a "NIC"), and then eventually transferred to computing system RANI and/or to less volatile storage devices at a computing system. Thus, it should be understood that hardware storage devices can be included in computing system components that also (or even primarily) utilize volatile hardware storage devices.

Computer-executable instructions comprise, for example, instructions and data which, when executed at a processor, cause a general-purpose computing system, special purpose computing system, or special purpose processing device to perform a certain function or group of functions. Alternatively, or in addition, the computer-executable instructions may configure the computing system to perform a certain function or group of functions. The computer-executable instructions may be, for example, binaries or even instructions that undergo some translation (such as compilation) before direct execution by the processors, such as intermediate format instructions such as assembly language, or even source code.

Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computing system configurations, including personal computers, desktop computers, laptop computers, message processors, handheld devices, multi-processor systems, microprocessor-based or programmable consumer electronics, network PCs, minicomputers, mainframe computers, mobile telephones, PDAs, pagers, routers, switches, datacenters, wearables (such as glasses) and the like. The invention may also be practiced in distributed system environments where local and remote computing systems, which are linked (either by hard-wired data links, wireless data links or by a combination of hard-wired and wireless data links) through a network, both perform tasks. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

The remaining figures may discuss various computing systems which may correspond to the computing system 100 previously described. The computing systems of the remaining figures include various components or functional blocks that may implement the various embodiments disclosed herein, as will be explained. The various components or functional blocks may be implemented on a local computing system or may be implemented on a distributed computing system that includes elements resident in the cloud or those implement aspects of cloud computing. The various components or functional blocks may be implemented as software, hardware, or a combination of software and hardware. The computing systems of the remaining figures may include more or less than the components illustrated in the figures, and some of the components may be combined as circumstances warrant. Although not necessarily illustrated, the various components of the computing systems may access and/or utilize a processor and memory, such as processing unit 102 and memory 104, as needed to perform their various functions.

Figure 2:
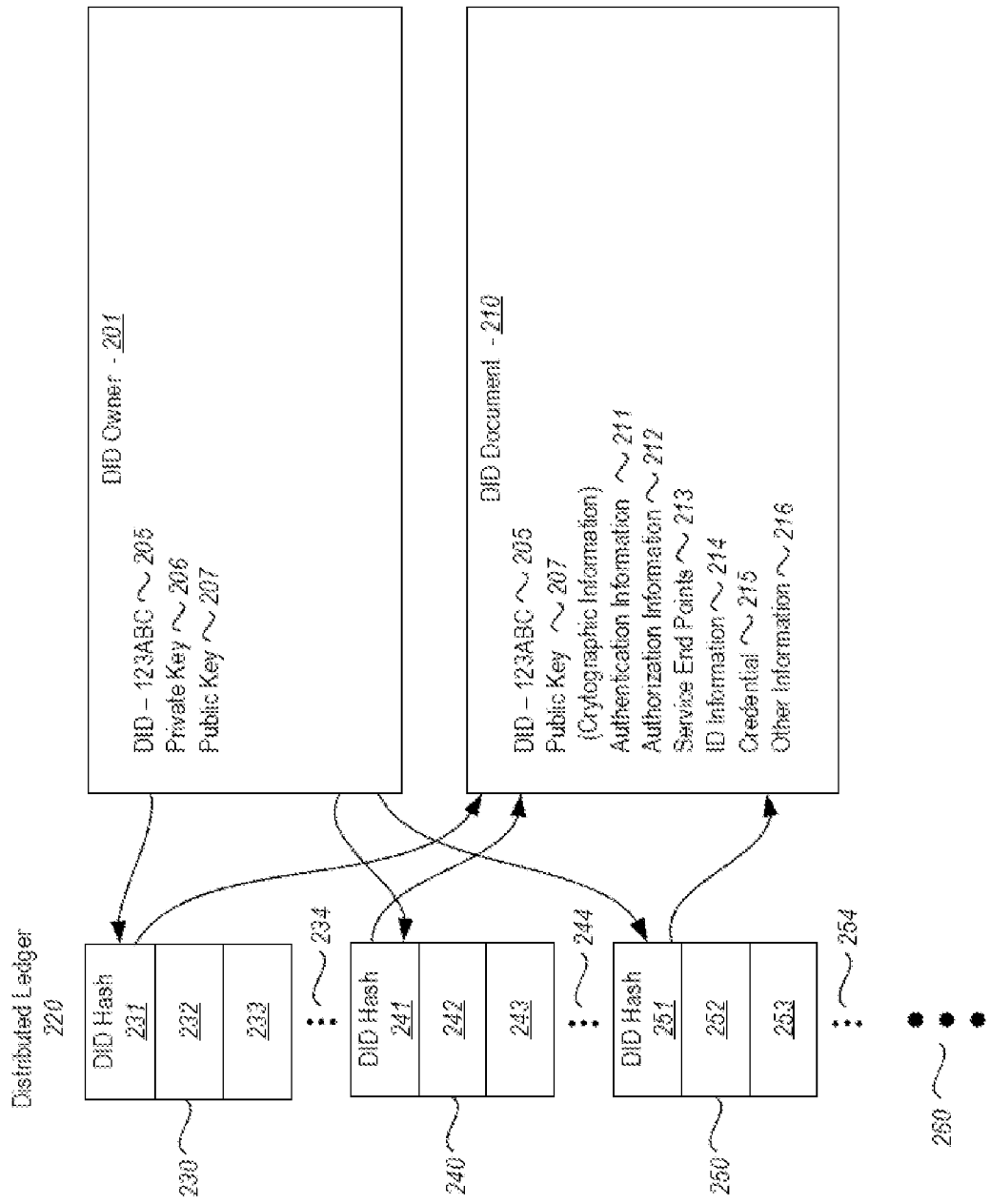
FIG. 2 illustrates an example environment for creating a decentralized identifier (DID)

Since the principles described herein are related to decentralized systems that use decentralized identifiers (DID) to authorize and/or authenticate transactions, some introductory discussion of a decentralized identifier (DID) and the environment in which they are created and reside will now be given with respect to FIG. 2. As illustrated in FIG. 2, a DID owner 201 may own or control a DID 205 that represents an identifier of the DID owner 201. The DID owner 201 may register a DID using a creation and registration service, which will be explained in more detail below.

The DID owner 201 may be any entity that could benefit from a DID. For example, the DID owner 201 may be a human being or an organization of human beings. Such organizations might include a company, department, government, agency, or any other organization or group of organizations. Each individual human being might have a DID, while the organization(s) to which each belongs might likewise have a DID.

The DID owner 201 may alternatively be a machine, system, or device, or a collection of machine(s), device(s) and/or system(s). In still other embodiments, the DID owner 201 may be a subpart of a machine, system or device. For instance, a device could be a printed circuit board, where the subpart of that circuit board are individual components of the circuit board. In such embodiments, the machine or device may have a DID, and each subpart may also have a DID. A DID owner might also be a software component such as the executable component 106 described above with respect to FIG. 1. An example of a complex executable component 106 might be an artificial intelligence. An artificial intelligence may also own a DID.

Thus, the DID owner 201 may be any reasonable entity, human or non-human, that is capable of creating the DID 205 or at least having the DID 205 created for and associated with them. Although the DID owner 201 is shown as having a single DID 205, this need not be the case as there may be any number of DIDs associated with the DID owner 201 as circumstances warrant.

As mentioned, the DID owner 201 may create and register the DID 205. The DID 205 may be any identifier that may be associated with the DID owner 201. Preferably, that identifier is unique to that DID owner 201, at least within a scope in which the DID is anticipated to be in use. As an example, the identifier may be a locally unique identifier, and perhaps more desirably a globally unique identifier for identity systems anticipated to operate globally. In some embodiments, the DID 205 may be associated with a Uniform Resource Identifier (URI) (such as a Uniform Resource Locator (URL)), or other pointers that relates the DID owner 201 to a mechanism to engage in trustable interactions with the DID owner 201.

The DID 205 is "decentralized" because it does not require a centralized, third-party management system for generation, management, or use. Accordingly, the DID 205 remains under the control of the DID owner 201. This is different from conventional centralized IDs based on trust in centralized authorities that remain under the control of the corporate directory services, certificate authorities, domain name registries, or other centralized authority (referred to collectively as "centralized authorities" herein). Accordingly, the DID 205 may be any identifier that is under the control of the DID owner 201 and independent of any centralized authority.

In some embodiments, the structure of the DID 205 may be as simple as a user name or some other human-understandable term. However, in other embodiments, the DID 205 may preferably be a random string of numbers and letters for increased security. In one embodiment, the DID 205 may be a string of a predetermined number of letters and numbers. For example, the predetermined number may be (but are not limited to) 128, 256, 512. Accordingly, the embodiments disclosed herein are not dependent on any specific implementation of the DID 205. In a very simple example, the DID 205 is shown as "123ABC".

As also shown in FIG. 2, the DID owner 201 has control of a private key 206 and public key 207 pair that are associated with the DID 20. Because the DID 205 is independent of any centralized authority, the private key 206 should at all times be fully in control of the DID owner 201. That is, the private and public keys should be generated in a decentralized manner that ensures that they remain under the control of the DID owner 201.

As will be described in more detail to follow, the private key 206 and public key 207 pair may be generated on a device controlled by the DID owner 201. The private key 206 and public key 207 pair should not be generated on a server controlled by any centralized authority as this may cause the private key 206 and public key 207 pair to not be fully under the control of the DID owner 201 at all times. Although FIG. 2 and this description have described a private and public key pair, it will also be noted that other types of reasonable cryptographic information and/or mechanism may also be used as circumstances warrant.

FIG. 2 also illustrates a DID document 210 that is associated with the DID 205. The DID document 210 may be generated at the time that the DID 205 is created. In its simplest form, the DID document 210 describes how to use the DID 205. Accordingly, the DID document 210 includes a reference to the DID 205, which is the DID that is described by the DID document 210. In some embodiments, the DID document 210 may be implemented according to methods specified by a distributed ledger 220 that will be used to store a representation of the DID 205. Thus, the DID document 210 may show different methods depending on the specific distributed ledger.

The DID document 210 also includes the public key 207 created by the DID owner 201 or some other equivalent cryptographic information. The public key 207 may be used by third-party entities that are given permission by the DID owner 201 to access information and data owned by the DID owner 201. The public key 207 may also be used to verify that the DID owner 201, in fact, owns or controls the DID 205.

The DID document 210 may also include authentication information 211. The authentication information 211 may specify one or more mechanisms by which the DID owner 201 is able to prove that the DID owner 201 owns the DID 205. In other words, the mechanisms of authentication information 211 may show proof of a binding between the DID 205 (and thus its DID owner 201) and the DID document 210. In one embodiment, the authentication information 211 may specify that the public key 207 be used in a signature operation to prove the ownership of the DID 205. Alternatively, or in addition, the authentication information 211 may specify that the public key 207 be used in a biometric operation to prove ownership of the DID 205. Accordingly, the authentication information 211 may include any number of mechanisms by which the DID owner 201 is able to prove that the DID owner 201 owns the DID 205.

The DID document 210 may also include authorization information 212. The authorization information 212 may include a particular mechanism that third parties or services may authorize or authenticate the DID owner 201, or that the distributed ledger 220 allows authorizes or authenticate the DID owner 201 to modify data associated with DID 205 that is previously recorded on the distributed ledger 220 and/or record new data associated with DID 205. For example, the authorization information 212 may allow the third party to update any designated set of one or more fields in the DID document 210 using any designated update mechanism. Alternatively, the authorization information may allow the third party to limit the usages of DID 205 by the DID owner 201 for a specified time period. This may be useful when the DID owner 201 is a minor child, and the third party is a parent or guardian of the child. The authorization information 212 may allow the parent or guardian to limit the use of the DID 205 until such time as the child is no longer a minor.

The authorization information 212 may also specify one or more mechanisms that the third party will need to follow to prove they are authorized to modify the DID document 210. In some embodiments, these mechanisms may be similar to those discussed previously with respect to the authentication information 211.

The DID document 210 may also include one or more service endpoints 213. A service endpoint may include a network address at which a service operates on behalf of the DID owner 201. Examples of specific services include discovery services, social networks, file storage services such as identity servers or hubs, and verifiable claim repository services. Accordingly, the service endpoints 213 operate as pointers for the services that operate on behalf of the DID owner 201. These pointers may be used by the DID owner 201 or by third-party entities to access the services that operate on behalf of the DID owner 201. Specific examples of service endpoints 213 will be explained in more detail later with respect to FIG. 4.

The DID document 210 may further include identification information 214. The identification information 214 may include personally identifiable information such as the name, address, occupation, family members, age, hobbies, interests, or the like of DID owner 201. Accordingly, the identification information 214 listed in the DID document 210 may represent a different persona of the DID owner 201 for different purposes. For instance, a persona may be pseudo-anonymous, e.g., the DID owner 201 may include a pen name in the DID document when identifying him or her as a writer posting articles on a blog; a persona may be fully anonymous, e.g., the DID owner 201 may only want to disclose his or her job title or other background data (e.g., a school teacher, an FBI agent, an adult older than 21 years old, etc.) but not his or her name in the DID document; and a persona may be specific to who the DID owner 201 is as an individual, e.g., the DID owner 201 may include information identifying him or her as a volunteer for a particular charity organization, an employee of a particular corporation, an award winner of a particular award, etc.

The DID document 210 may also include credential information 215, which may also be referred to herein as an attestation. The credential information 215 may be any information that is associated with the DID owner 201's background. For instance, the credential information 215 may be (but not limited to) a qualification, an achievement, a government ID, a government right such as a passport or a driver's license, a payment provider or bank account, a university degree, or other educational histories, employment status and history, or any other information about the DID owner 201's background.

The DID document 210 may also include various other information 216. In some embodiments, the other information 216 may include metadata specifying when the DID document 210 was created and/or when it was last modified. In other embodiments, the other information 216 may include cryptographic proofs of the integrity of the DID document 210. In still further embodiments, the other information 216 may include additional information that is either specified by the specific method implementing the DID document or desired by the DID owner 201.

FIG. 2 also illustrates a distributed ledger or blockchain 220. The distributed ledger 220 may be any decentralized, distributed network that includes various computing systems that are in communication with each other. For example, the distributed ledger 220 may be stored at a first distributed computing system 230, a second distributed computing system 240, a third distributed computing system 250, and any number of additional distributed computing systems as illustrated by the ellipses 260. The distributed ledger or blockchain 220 may operate according to any known standards or methods for distributed ledgers. Examples of conventional distributed ledgers that may correspond to the distributed ledger or blockchain 220 include, but are not limited to, Bitcoin [BTC], Ethereum, and Litecoin.

In the context of DID 205, the distributed ledger or blockchain 220 is used to store a representation of and/or data associated with the DID 205 that may be retrieved and used to generate the DID document 210.

As mentioned, a representation of and/or data associated with the DID 205 is stored on each distributed computing system of the distributed ledger or blockchain 220. For example, in FIG. 2 this is shown as the DID hash 231, DID hash 241, and DID hash 251, which are hashes of transactions associated with the same DID. The DID hash 231, DID has DID hash 241, and DID hash 251 may then be retrieved and used to generate the DID document 210. The distributed ledger or blockchain 220 may also store numerous other representations of other DIDs as illustrated by references 232, 233, 234, 242, 243, 244, 252, 253, and 254.

In one embodiment, when the DID owner 201 creates the DID 205, the event of creating the DID 205 is hashed into the DID hash 231 and recorded in the distributed ledger or blockchain 220. The distributed ledger or blockchain 220 thus records that the DID 205 now exists. Since the distributed ledger or blockchain 220 is decentralized, the DID 205 is not under the control of any entity outside of the DID owner 201. The data recorded in the distributed ledger or blockchain 220 may also include a record or time stamp that specifies when the DID 205 was created. At a later date, when modifications are made to attributes associated with the DID 205, this may also be recorded in a new DID hash (e.g., DID hash 241). The DID hash 231, DID hash 241, and DID hash 251 may further include a copy of the public key 207 so that the DID 205 is cryptographically bound to the DID document 210.

Figure 3:
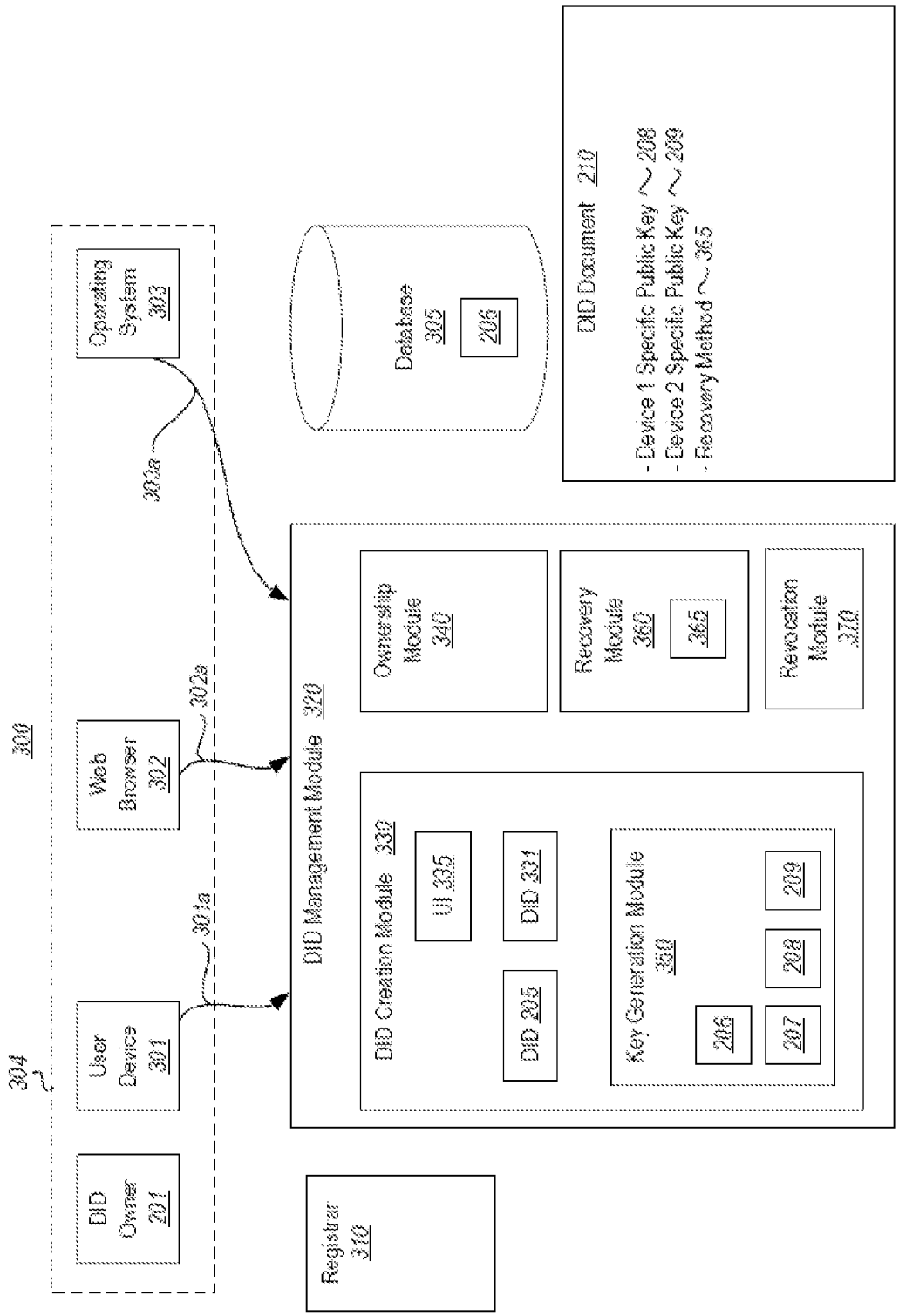
FIG. 3 illustrates an example environment for various DID management operations and services.

Having described DIDs and how they generally operate with reference to FIG. 2, specific embodiments of DIDs will now be explained. Turning to FIG. 3, an environment 300 that may be used to perform various DID lifecycle management operations and services will now be explained. It will be appreciated that the environment of FIG. 3 may reference elements from FIG. 2 as needed for ease of explanation.

As shown in FIG. 3, the environment 300 may include various devices and computing systems that may be owned or otherwise under the control of the DID owner 201. These may include a user device 301. The user device 301 may be, but is not limited to, a mobile device such as a smartphone, a computing device such as a laptop computer, or any device such as a car or an appliance that includes computing abilities. The device 301 may include a web browser 302 operating on the device and an operating system 303 operating the device. More broadly speaking, the dashed line 304 represents that all of these devices may be owned or otherwise under the control of the DID owner 201.

The environment 300 also includes a DID lifestyle management module 320. It will be noted that in operation, the DID lifecycle management module 320 may reside on and be executed by one or more of user device 301, web browser 302, and the operating system 303 as illustrated by the lines 301*a*, 302*a*, and 303*a*. Accordingly, DID lifecycle management module 320 is shown as being separate for ease of explanation.

As shown in FIG. 3, the DID lifecycle management module 320 includes a DID creation module 330. The DID creation module 330 may be used by the DID owner 201 to create the DID 205 or any number of additional DIDs, such as DID 331. In one embodiment, the DID creation module may include or otherwise have access to a User Interface (UI) 335 that may guide the DID owner 201 in creating the DID 205. The DID creation module 330 may have one or more drivers that are configured to work with specific distributed ledgers such as distributed ledger 220 so that the DID 205 complies with the underlying methods of that distributed ledger.

A specific embodiment will now be described. For example, the UI 335 may provide a prompt for the user to enter a user name or some other human recognizable name. This name may be used as a display name for the DID 205 that will be generated. As previously described, the DID 205 may be a long string of random numbers and letters and so having a recognizable human name for a display name be advantageous. The DID creation module 330 may then generate the DID 205. In the embodiments having the UI 335, the DID 205 may be shown in a listing of identifiers and may be associated with the recognizable human name.

The DID creation module may also include a key generation module 350. The key generation module may generate the private key 206 and public key 207 pair previously described. The DID creation module 330 may then use the DID 205 and the private and public key pair to generate the DID document 210.

In operation, the DID creation module 330 accesses a registrar 310 that is configured to the specific distributed ledger that will be recording the transactions related to the DID 205. The DID creation module 330 uses the registrar 310 to record the DID hash 231, DID hash 241, and DID hash 251 in the distributed ledger in the manner previously described and/or retrieve the data stored in the distributed ledger and generate the DID document 210 in the manner previously described. This process may use the public key 207 or the corresponding private key 206 in the hash generation.

In some embodiments, the DID lifecycle management module 320 may include an ownership module 340. The ownership module 340 may provide mechanisms that ensure that the DID owner 201 is aware that the DID owner 201 is in sole control of the DID 205. In this way, the provider of the DID lifecycle management module 320 is able to ensure that the provider does not control the DID 205, but is only providing the management services.

As previously discussed, the key generation module 350 generates the private key 206 and public key 207 pair, and the public key 207 is then recorded with the transactions associated with the DID 205. Accordingly, the public key 207 may be used by all devices associated with the DID owner 201 and all third parties that desire to provide services to the DID owner 201. When the DID owner 201 desires to associate a new device with the DID 205, the DID owner 201 may execute the DID creation module 330 on the new device. The DID creation module 330 may then use the registrar 310 to record the transaction indicating that the new device is now associated with the DID 205 on the distributed ledger 220 as previously described.

In some embodiments, however, it may be advantageous to have a public key per device 301 owned by the DID owner 201 as this may allow the DID owner 201 to sign with the specific device public key without having to access a general public key. In other words, since the DID owner 201 will use different devices at different times (for example, using a mobile phone in one instance and then using a laptop computer in another instance) it is advantageous to have a key associated with each device to provide efficiencies in signing using the keys. Accordingly, in such embodiments, the key generation module may generate additional public keys 208 and 209 when the additional devices execute the DID creation module 330. These additional public keys may be associated with private key 206 or, in some instances, may be paired with a new private key.

In those embodiments where the additional public keys 208 and 209 are associated with different devices, the additional public keys 208 and 209 may be recorded on the distributed ledger 220 as being associated with those devices. This is shown in FIG. 3. It will be appreciated that the DID document 210 may include the information previously described in relation to FIG. 2 in addition to the information shown in FIG. 3. If the DID 205 existed prior to the device-specific public keys being generated, then the data associated with the DID 205 would be updated by the creation module 330 via the registrar 310, and this would be reflected in an updated transaction on the distributed ledger 220.

In some embodiments, the DID owner 201 may desire to keep the association of a device with a public key or even with the DID 205 a secret. Accordingly, the DID creation module 330 may cause that such data be secretly shown in the DID document 210.

As described thus far, the DID 205 has been associated with all the devices under the control of the DID owner 201, even when the devices have their own public keys. However, in some embodiments, it may be useful for each device or some subset of devices under the control of the DID owner 201 to each have their own DID. Thus, in some embodiments, the DID creation module 330 may generate an additional DID, for example, DID 331, for each device. The creation module would then generate private and public key pairs and DID documents for each of the devices and have them recorded on the distributed ledger 220 in the manner previously described. Such embodiments may be advantageous for devices that may change ownership as it may be possible to associate the specific device DID to the new owner of the device by granting the new owner authorization rights in the DID document and revoking such rights from the old owner.

As mentioned, the private key, to ensure that it is totally in the control of the DID owner 201, is created on the user device 301, browser 302, or operating system 303 owned or controlled by the DID owner 201 that executed the DID management module 320. In this way, there is little chance that a third party may gain control of the private key 206, especially the provider of the DID lifecycle management module 320. However, there is a chance that the device storing the private key 206 may be lost by the DID owner 201, which may cause the DID owner 201 to lose access to the DID 205. Accordingly, in some embodiments, the UI 335 may include the option to allow the DID owner 201 to export the private key 206 to an off-device secured database 305, storage device, and/or even a piece of paper that is under the control of the DID owner 201. In some embodiments, the private key 206 may be stored as a QR code that may be scanned by the DID owner 201.

In other embodiments, the DID lifecycle management module 320 may include a recovery module 360 that may be used to recover a lost private key 206. In operation, the recovery module 360 allows the DID owner 201 to select one or more recovery mechanisms 365 at the time the DID 205 is created that may later be used to recover the lost private key. In those embodiments having the UI 335, the UI 335 may allow the DID owner 201 to provide the required information that will be needed by the one or more recovery mechanisms 365 when the recovery mechanisms are implemented. The recovery module may then be run on any device associated with the DID 205.

The DID lifecycle management module 320 may also include a revocation module 370 that is used to revoke or sever a device from the DID 205. In operation, the revocation module may use the UI 335, which may allow the DID owner 201 to indicate a desire to remove a device from being associated with the DID 205. In one embodiment, the revocation module may record the revocation transaction on the distributed ledger 220. After the revocation transaction is recorded on the distributed ledger 220, the DID document 210, generated based on the updated data stored on the distributed ledger 220, would remove the device as an associated device of the DID 205. Alternatively, the public key for the device may be removed. This change in the DID document 210 may then be reflected as an updated transaction on the distributed ledger 220 as previously described.

Figure 4:
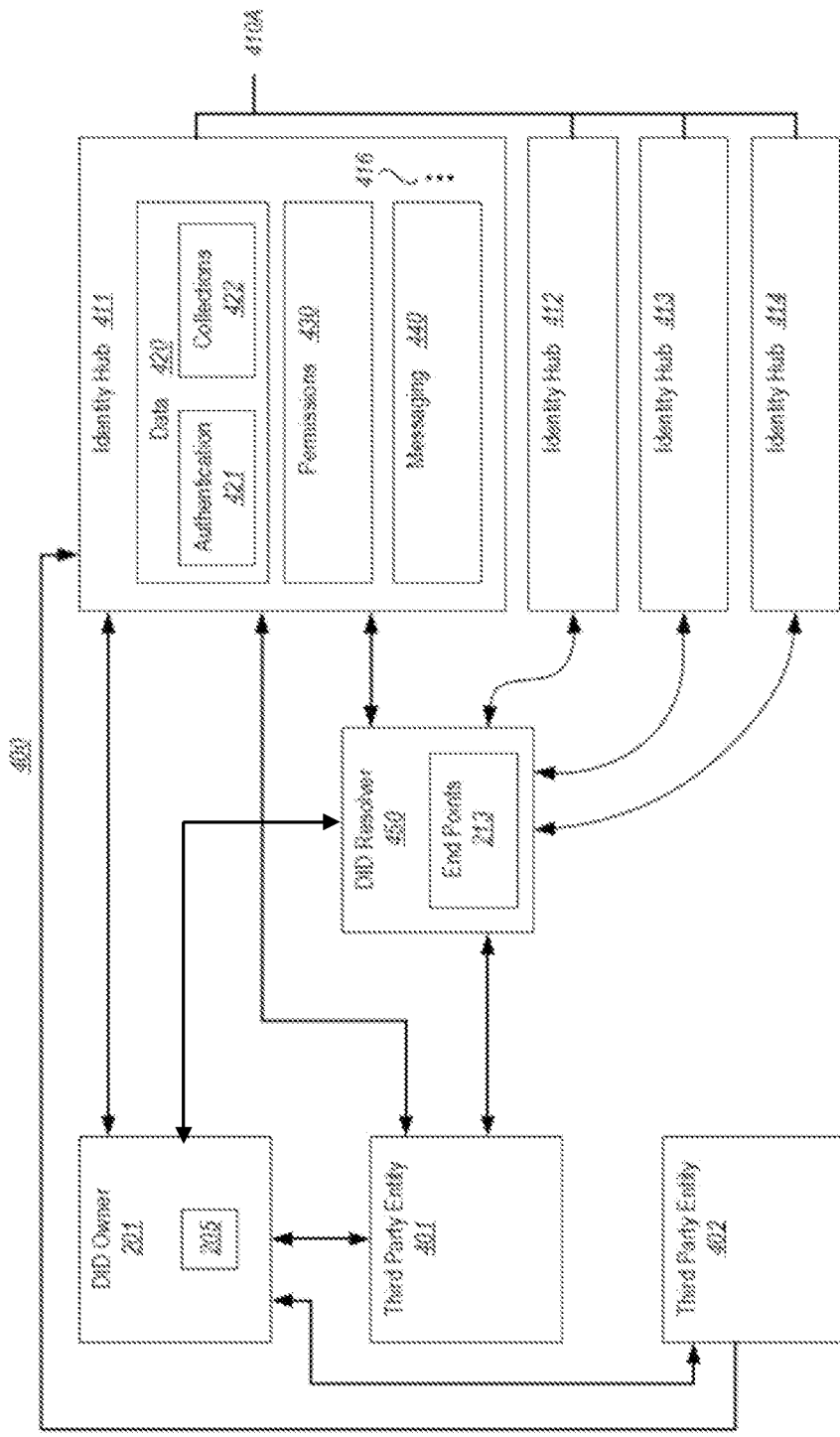
FIG. 4 illustrates an example of a decentralized service (also referred to as identity hubs) that is provided in a decentralized environment.

Further, in a decentralized environment, service providers can provide various services to users associated with DID and using distributed ledgers to authorize and/or authenticate users. FIG. 4 illustrates an example of a storage service (also referred to as identity hub(s) 410A) provided in a decentralized environment 400. It will be noted that FIG. 4 may include references to elements first discussed in relation to FIG. 2 or 3 and thus use the same reference numeral for ease of explanation.

In some embodiment, the identity hubs 410A may include multiple identity hubs 411-414, each of which is provided by a different service provider. Alternatively, the identity hubs 410A may be multiple instances of the same identity hub. Thus, the various identity hubs 410A may include at least some of the same data and services. Accordingly, if any change is made to one of the identity hubs 410A, the change may be reflected in the remaining identity hubs. For example, the first identity hub 411 and second identity hub 412 are implemented in cloud storage and thus may be able to hold a large amount of data. Accordingly, a full set of the data may be stored in these identity hubs. However, the identity hubs 412 and 413 may have less memory space. Accordingly, in these identity hubs, a descriptor of the data stored in the first and second identity hubs may be included. Alternatively, a record of changes made to the data in other identity hubs may be included. Thus, changes in one of the identity hubs 410A are either fully replicated in the other identity hubs, or at least a record or descriptor of that data is recorded in the other identity hubs.

Because the identity hubs 411-414 (either provided by a same entity or different entities, and/or either storing same data or different data) may operate in a similar manner, only a full description of the first identity hub 411 will be provided as this description may also apply to the identity hubs 412-414. As illustrated, identity hub 411 may be used to store data 420. The data 420 include any type of data that is associated with the DID owner 201. In one embodiment, the data may be a collection 422 of a specific type of data corresponding to a specific protocol. The collection 422 may be any other type of data. For example, the collection 422 may be medical records data that corresponds to a specific protocol for medical data.

In one embodiment, the stored data may have different authentication and privacy settings 421 associated with the stored data. For example, a first subset of the data may have a setting 421 that allows the data to be publically exposed, but that does not include any authentication to the DID owner 201. This type of data may be for relatively unimportant data such as color schemes and the like. A second subset of the data may have a setting 421 that does not allow the data to be publically exposed, and that includes authentication to the DID owner 201. A third subset of the data may have a setting 421 that encrypts the subset of data with the private key 206 and public key 207 pair (or some other keys) associated with the DID owner 201. This type of data will require a party to have access to the private key 206 or to some other associated private key 206 in order to decrypt the data. This process may also include authentication to the DID owner 201. A fourth subset of the data may have a setting 421 that restricts this data to a subset of third parties. This may require that private keys associated with the subset of third parties be used to decrypt the data. For example, the DID owner 201 may cause the setting 421 to specify that only private keys associated with friends of the DID owner 201 may decrypt this data.

In some embodiments, the identity hub 411 may have a permissions module 430 that allows the DID owner 201 to set specific authorization or permissions for third parties such as third parties 401 and 402 to access the identity hub. For example, the DID owner 201 may provide access permission to his or her spouse to all the data 420. Alternatively, the DID owner 201 may allow access to his or her doctor for any medical records. It will be appreciated that the DID owner 201 may grant permission to any number of third parties to access a subset of the data 420.

The identity hub 411 may also have a messaging module 440. In operation, the messaging module allows the identity hub to receive messages such as requests from parties such as third parties 401 and 402 to access the data and services of the identity hub. In addition, the messaging module 440 allows the identity hub 411 to respond to the messages from the third parties and to also communicate with a DID resolver 450. The ellipses 416 represent that the identity hub 411 may have additional services as circumstances warrant.

In one embodiment, the DID owner 201 may wish to authenticate a new device 301 with the identity hub 411 that is already associated with the DID 205 in the manner previously described. Accordingly, the DID owner 201 may utilize the DID management module 320 associated with the new user device 301 to send a message to the identity hub 411 asserting that the new user device is associated with the DID 205 of the DID owner 201. However, the identity hub 411 may not initially recognize the new device as being owned by the DID owner 201. Accordingly, the identity hub 411 may use the messaging module 440 to contact the DID resolver 450. The message sent to the DID resolver 450 includes the DID 205. In some embodiments, the message also includes additional data associated with the DID 205.

The DID resolver 450 may be a service, application, or module that is configured in operation to search the distributed ledger 220 for data associated with a DID 205 and generate a DID document 210 associated with DIDs based on the search of the distributed ledger 220. Accordingly, in the embodiment, the DID resolver 450 may search the distributed ledger 220 using the DID 205, which may result in the DID resolver 450 generating the DID document 210. The DID document 210 may then be provided to the identity hub 411.

As discussed previously, the DID document 210 may include a public key 208 or 209 that is associated with the new user device 301. To verify that the new user device is owned by the DID owner 201, the identity hub 411 may provide a cryptographic challenge to the new user device 301 using the messaging module 440. This cryptographic challenge will be structured such that only a device having access to the private key 206 will be able to answer the challenge successfully.

In the embodiment, since the new user device is owned by DID owner 201 and thus has access to the private key 206, the challenge may be successfully answered. The identity hub 411 may then record in the permissions module 430 that the new user device 301 is able to access the data and services of the identity hub 411 and also the rest of the identity hubs 410A.

It will be noted that this process of authenticating the new user device 301 was performed without the need for the DID owner 201 to provide any username, password, or the like to the provider of the identity hub 411 (i.e., a cloud storage provider) before the identity hub 411 could be accessed. Rather, the access was determined in a decentralized manner based on the DID 205, the DID document 210, and the associated public and private keys. Since these were at all times in the control of the DID owner 201, the provider of the identity hub 411 was not involved and thus has no knowledge of the transaction or of any personal information of the DID owner 201.

In another example embodiment, the DID owner 201 may provide the DID 205 to the third party 401 so that the third party may access data or services stored on the identity hub 411. For example, the DID owner 201 may be a human who is at a scientific conference who desires to allow the third party 401, who is also a human, access to his or her research data. Accordingly, the DID owner 201 may provide the DID 205 to the third party 401.

Once the third party 401 has access to the DID 205, he or she may access the DID resolver 450 to generate the DID document 210. As previously discussed, the DID document 210 may include a service endpoint 213 that is an address or pointer to the identity hub 411. The third party 401 may then use the address or pointer to access the identity hub 411.

The third party 401 may send a message to the messaging module 440 asking for permission to access the research data. The messaging module 440 may then send a message to the DID owner 201 asking if the third party 401 should be given access to the research data. Because the DID owner desires to provide access to this data, the DID owner 201 may allow permission to the third party 401, and this permission may be recorded in the permissions module 430.

The messaging module 440 may then message the third party 401 informing the third party that he or she is able to access the research data. The identity hub 411 and the third party 401 may then directly communicate so that the third party may access the data. It will be noted that in many cases, it will actually be an identity hub associated with the third party 401 that communicates with the identity hub 411. However, it may be a device of the third party 401 that does the communication.

Similarly, in some embodiments, the identity hub 411 is also associated with a DID. Before the DID owner 201 decides to use the service provided by the identity hub 411, the DID owner 201 can also communicate with the DID resolver 450 to obtain a DID document associated with the identity hub 411. Based on the information recorded in the DID document, the DID owner 201 may decide whether they would like to retain the service provided by the identity hub 411.

Advantageously, the above-described process allows the identity hub 411, the DID owner 201, and the third party 401 to communicate and to share the data without the need for the third party to access the identity hub 411 in a conventional manner. Rather, the communication is provisioned in a decentralized manner using the DID 205 and the DID document 210. This advantageously allows the DID owner to be in full control of the process.

As shown in FIG. 4, the third party 402 may also request permission for access to the identity hub 411 using the DID 205 and the DID document 210. Accordingly, the embodiments disclosed herein allow access to any number of third parties to the identity hubs 410A.

As described above, decentralized systems provide a fairly secure data storage for the users (e.g., DID owners). Without the private key of DID, it almost impossible for other parties to access the DID owner's data, unless the DID owner grants a permission to the other party to access the DID owner's data. The principles described herein will further allow a user (e.g., a DID owner) to specify a scope of permission that is specific to be used in the execution of a particular application or a type of application.

In the modern world, many service providers require customers to provide their personal information, including (but not limited to) payment information, name, and address, etc., before the service providers provide the service to the customer. In the decentralized environment, a service provider is associated with a DID (also referred to as a first DID). The user is also likely to be associated with a DID (also referred to as a second DID). When a user wants to retain service from the service provider, the service provider will send a request (e.g., an information request, a payment request) to the user, and the request includes the DID of the service provider, and other data associated with the service provider, such as the business name, address, and/or a linked domain that is linked to the DID. In some embodiments, when the user's computing system (e.g., the management module or a wallet app) receives the request, the user's computing system sends the DID to a DID resolver, causing the DID resolver to resolve the DID and generate a DID document associated with the DID. Based on the DID document, the user may determine whether the request is to be accepted or rejected. However, in some cases, it is difficult for a user to determine whether the service provider is trustworthy merely based on the data shown on the DID document.

The principles described herein provide users an additional service and an extra layer of security via a trust score generator configured to bootstrap trust in DIDs. The trust score generator is implemented at the user's computing system, the DID resolver, and/or a separate service. Further details of the embodiments of the systems and the methods for bootstrapping trust in DIDs are described with respect to FIGS. 5A-5B, 6, 7A-7D, and 8-11.

Figure 5A:
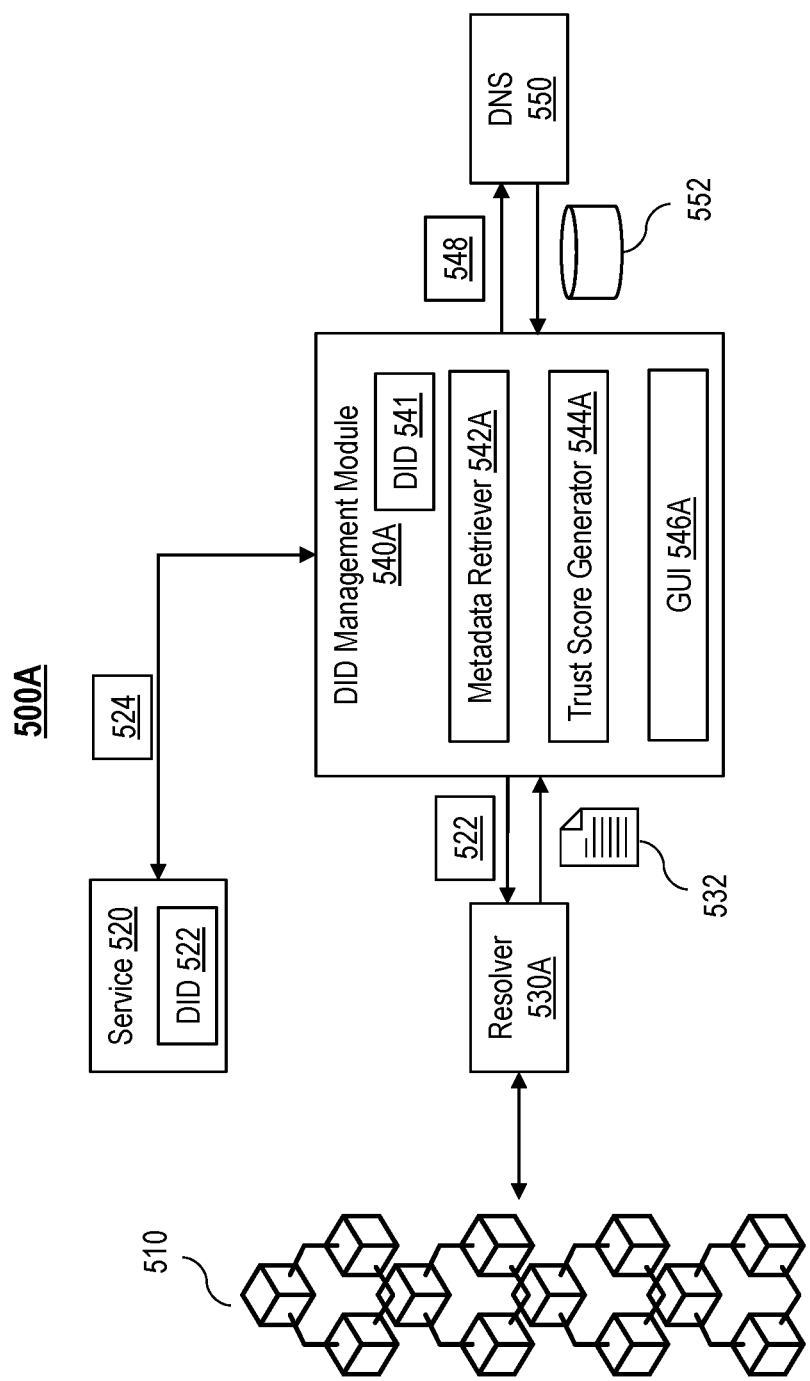
FIG. 5A illustrates an example of a decentralized environment, in which a DID management module is configured to retrieve metadata associated with a linked domain of a DID and generate a trust score of the DID based on the metadata associated with the linked domain.

FIG. 5A illustrates a decentralized environment 500A that includes a DID management module 540A that embodies the principles described herein. As illustrated, a service provider 520 associated with a DID 522 (also referred to as a first DID) is configured to send a request to a DID management module 540A. The service provider 520 is configured to provide service to user in a decentralized manner. For example, in some embodiments, the service provider 520 is an ID hub 411-414 of FIG. 4. The DID management module 540A corresponds to the DID management module 320 of FIG. 3. In some embodiments, the DID management module 540A is a user agent or a wallet app installed at a user's computing system (e.g., a mobile device). The DID management module 540A includes a trust score generator 544A configured to generate a trust score indicating the trustworthiness of the service provider 520. In some embodiments, the user is also associated with a DID 541 (also referred to as a second DID). Each of the DIDs 522 and 541 corresponds to the DID 205 in FIG. 2.

Before the service provider 520 provides its service to the user, the service provider 520 often requests some information from the user. In a decentralized environment, the service provider 520 (i.e., a computing system associated with the service provider) sends a request to the DID management module 540A. The request includes the DID 522 of the service provider 520 and other information associated with the service provider 520, such as (but not limited to) the service provider's name, address, phone number, and/or a linked domain that is linked to the DID 522.

When the DID management module 540A receives the request from the service provider 520, the DID management module 540A forwards the DID 522 to a DID resolver 530A, which is configured to traverse a distributed ledger 510 to obtain data associated with the DID 522. The DID resolver 530A then generates a DID document 532 (which corresponds to the DID document 210 of FIG. 2) based on the obtained data associated with the DID 522. The DID document 532 is then sent to the DID management module 540A. Receiving the DID document 532, the DID management module 540A is configured to parse the DID document to extract various data associated with the DID 522. In particular, the DID management module 540A is configured to extract a linked domain that is linked to the DID 522 from the DID document 532. Based on the linked domain, the DID management module 540A is configured to obtain metadata associated with the linked domain and generate a trust score based on the metadata associated with the linked domain.

In some embodiments, the DID management module 540A includes a metadata retriever 542A, a trust score generator 544A, and a graphical user interface (GUI) 546. The metadata retriever 542A is configured to forward the linked domain 548 to a DNS 550. Receiving the linked domain, the DNS 550 retrieves metadata 552 associated with the linked domain 548 and sends the metadata 552 associated with the linked domain to the DID management module 540A. Receiving the metadata 552 associated with the linked domain 548, the trust score generator 544A is configured to generate a trust score indicating the trustworthiness of the service provider 520.

Once the trust score generator 544A generates the trust score, the GUI 546 is configured to visualize the trust score, such that the user can easily understand the trustworthiness of the service provider 520 and make an informed decision whether they would like to accept the request from the service provider 520 or reject it.

Figure 5B:
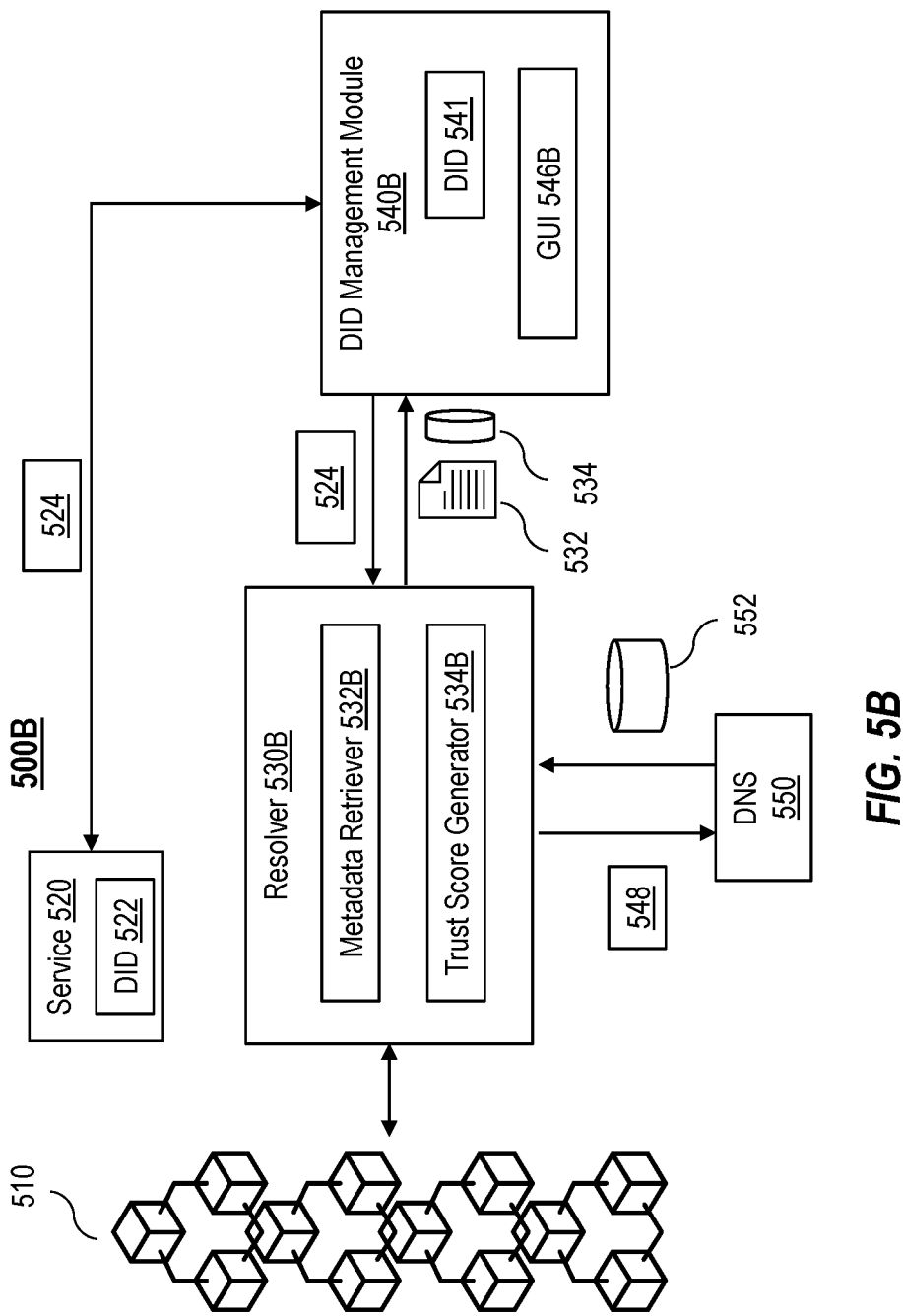
FIG. 5B illustrates another example of a decentralized environment, in which a DID resolver is configured to retrieve metadata associated with a linked domain of a DID and generate a trust score of the DID.

As briefly discussed above, in some embodiments, the trust score generator may also be implemented at a DID resolver. FIG. 5B illustrates a decentralized environment 500B, in which a DID resolver 530B implements a metadata retriever 532B and a trust score generator 534B. Similar to the trust score generator 544A of FIG. 5A, the trust score generator 534B is configured to generate a trust score, indicating the trustworthiness of a service provider 520. Also, similar to those shown in FIG. 5A, the service provider 520 is associated with a DID 522, and a DID management module 540B is associated with a DID 541. When the service provider 520 sends a request 524 (including the DID 522 of the service provider and additional data related to the service provider) to the DID management module 540B, the DID management module 540B forwards the request 524 or 524' to the DID resolver 530B. Notably, the request 524' forwarded to the DID resolver 530B may or may not be identical to the request 524 or in the same format as the data contained in the request 524 from the service provider 520. In some embodiments, the DID management module 540B parses the request 524 from the service provider and reorganizes the data in the original request 524 to generate a new request 524'. The new request 524' is then sent to the DID resolver 530B. For example, in some embodiments, the new request 524' indicates that the DID management module 540B would like the DID resolver 530B to generate a trust score or provide a recommendation of whether the request should be accepted or rejected.

Receiving the request 524' from the DID management module 540B, the DID resolver 530B is configured to traverse a distributed ledger 510 to obtain data associated with the DID 522 of the service provider 520, among which there is a linked domain associated with the DID 522. Based on the linked domain obtained from the distributed ledger 510, the DID resolver 530B is further configured to obtain metadata associated with the linked domain and generate a trust score, indicating the trustworthiness of the service provider 520.

In some embodiments, the DID resolver 530B includes a metadata retriever 532B (which is similar to the metadata retriever 542A of FIG. 5A) and a trust score generator 534B (which is similar to the trust score generator 544A of FIG. 5A). The metadata retriever 532B is also configured to forward the linked domain 548 to a DNS 550. Receiving the linked domain, the DNS 550 retrieves metadata 552 associated with the linked domain 548 and sends the metadata 552 associated with the linked domain to the DID resolver 530B. Receiving the metadata 552 associated with the linked domain 548, the trust score generator 534B is configured to generate a trust score indicating the trustworthiness of the service provider 520. As such, the DID resolver 530B is not only able to resolve the DID 522 and generate a DID document associated with the DID 522, but also able to generate a trust score associated with the DID 522. The generated DID document 532 and the trust score 534 associated with the DID 522 are then sent to the DID management module 540B. In some embodiments, the DID management module 540B further includes a GUI 546B. Once the DID management module 540B receives the DID document 532 and the trust score 534 from the resolver 530B, the GUI 546B is configured to visualize the DID document 532 and/or the trust score 534, such that the user can easily understand the trustworthiness of the service provider 520 and/or the DID 522 associated with the service provider 520.

In some embodiments, the DID management module 540A, 540B is also configured to provide a recommendation, recommending whether the user should accept or reject the request 524 from the service provider 520 based on the trust score generated by the trust score generator 544A, 534B. In some embodiments, the DID management module 540A, 540B is also configured to automatically accept or reject the request 524 from the service provider 520 based on the trust score generated by the trust score generator 544A, 534B.

To generate the trust score, in some embodiments, the trust score generator 544A, 534B is configured to parse the metadata 552 associated with the linked domain to extract one or more first values of one or more first attributes associated with the linked domain 548. The trust score generator 544A, 534B is further configured to parse the data associated with the DID 522 (contained in the request 524) to extract one or more second values of one or more second attributes associated with the DID 522. The extracted one or more first values of the one or more first attributes and the one or more second values of the one or more second attributes are then compared against each other to determine similarity therebetween. The more similar the two sets of values of the two sets of attributes, the more trustworthy the service provider 520 likely is, because the metadata recorded at the DNS 550 is consistent with what the service provider 520 says who they are.

Figure 6:
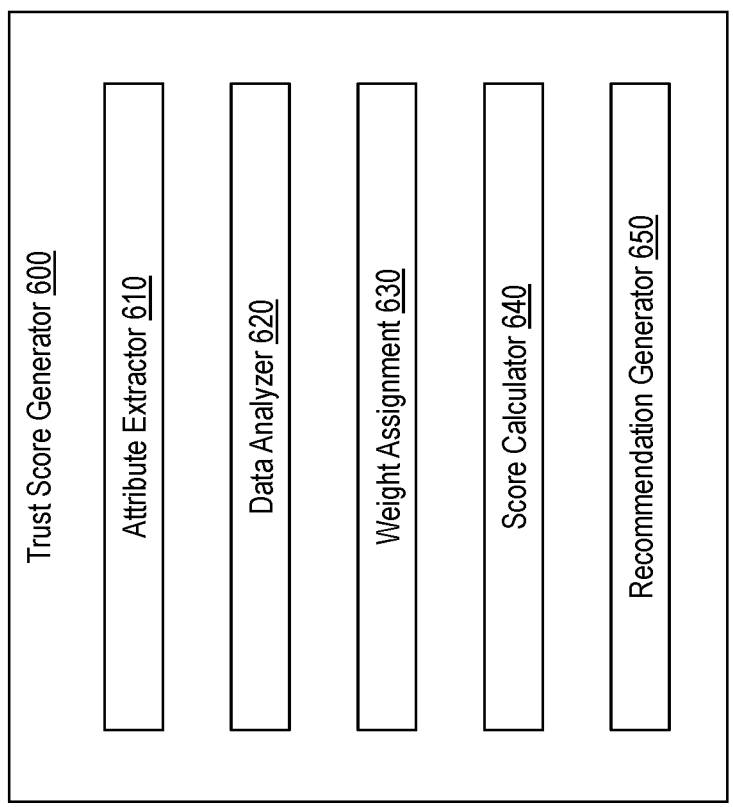
FIG. 6 illustrates an example of an embodiment of a trust score generator that may be implemented in the DID management module of FIG. 5A or the DID resolver of FIG. 5B.

FIG. 6 illustrates an example of an embodiment of a trust score generator 600, which corresponds to the trust score generator 544A, 534B. The trust score generator 600 includes an attribute extractor 610. The attribute extractor 610 is configured to extract one or more first values of one or more first attributes associated with the linked domain 548 and one or more second values of the one or more second attributes from a DID document associated with a DID. In some embodiments, the attribute extractor 610 includes a natural language processor configured to extract semantic meanings from textual datasets.

In some embodiments, the trust score generator 600 also includes a data analyzer 620. The data analyzer 620 is configured to analyze the one or more first values of the one or more first attributes against one or more second values of the one or more second attributes. In some embodiments, the data analyzer 620 includes a machine-learned artificial intelligence (AI) model configured to compare the values of the first attributes and the values of the second attributes to generate one or more scores associated with one or more scoring criteria.

In some embodiments, the one or more first attributes include (but are not limited to) (1) creation date of the linked domain, (2) registrant organization of the linked domain, (3) a registrant's address of the linked domain, (4) a phone number of the registrant of the linked domain, and/or (5) a fax number of the registrant of the linked domain. In some embodiments, the one or more second attributes include (but are not limited to) (1) a name of the entity, (2) an address of the entity, (3) a phone number of the entity, (4) a fax number of the entity, (5) an email address of the entity, or (6) a creation date of the DID associated with the entity. The one or more first values of the one or more first attributes are then compared with the one or more second values of the one or more second attributes to determine one or more scores for one or more scoring criteria.

In some embodiments, a scoring criterion is related to similarity (e.g., a similarity score) between a first value of a first attribute and a second value of a second attribute. For example, a first attribute may be a name of the service provider 520, and a second attribute may be a registrant name of the linked domain 548. The data analyzer 620 is configured to determine the similarity (e.g., a similarity score) between the name of the service provider 520 and the registrant name of the linked domain 548. If the name of the service provider 520 does not match the registrant name of the linked domain 548, and the similarity score of the name of the service provide 520 and the registrant name of the linked domain 548 is low, the service provider 520 is deemed to be less trustworthy. As another example, a first attribute may be an address of the service provider 520, and a second attribute may be a registrant address of the linked domain 548. If the address of the service provider 520 is the same as the registrant address of the linked domain 548, the service provider 520 is deemed to be more trustworthy. In some embodiments, each of the one or more scoring criteria is assigned a weight, and an overall trust score is computed based on weighted one or more scores for the one or more scoring criteria.

In some embodiments, the trust score generator 600 also includes a weight assignment module 630. The weight assignment module 630 is configured to assign a weight to each of the one or more scores associated with the one or more scoring criteria. For example, in some embodiments, a similarity score between the organization name contained in the request 524 from the service provider 520 and the organization name of the registrant of the linked domain has a first weight. A similarity score between the address of the service provider contained in the request 524 from the service provider 520 and the address of the registrant of the linked domain has a second weight. The first weight and the second weight are different. In some embodiments, the trust score generator 600 also includes a score calculator 640. The score calculator 640 is configured to generate an overall score based on the one or more scores associated with the one or more scoring criteria and their corresponding weights.

In some embodiments, the trust score generator 600 also includes a recommendation generator 650 configured to recommend whether a request from an entity (e.g., a service provider) should be accepted or rejected based on the trust score calculated by the score calculator 640. In some embodiments, when a trust score of a request is lower than a first predetermined threshold, the DID management module 540A, 540B is caused to automatically reject the request; and/or when a trust score of a request is higher than a second predetermined threshold, the DID management module 540A, MOB is caused to automatically accept the request. In some embodiments, when a trust score of a request is between the first predetermined threshold and the second predetermined threshold, the DID management module 540A, MOB generates a warning, or a notification, notifying the user the trust score and/or asking the user to manually make a decision whether the request should be accepted or rejected.

In some embodiments, the recommendation of whether the request should be accepted or rejected is further based on one or more characters of the request. The one or more characters of the request include (but are not limited to) a type of data requested by the request, or a type of service that the entity is to provide. For example, when sensitive information is requested by the service provider 520, the first predetermined threshold and/or the second predetermined threshold are increased, such that a greater range of score is automatically rejected, and/or a smaller range of score is automatically accepted. As another example, if the service provided by the service provider 520 is a free social media service, the first predetermined threshold and/or the second predetermined threshold may be decreased, such that a smaller range of score is automatically rejected, and a greater range of score is automatically accepted. On the other hand, if the service provided by the service provider 520 is an expensive and critical service, higher trustworthiness may be required.

The generated trust score is then visualized by the GUI 546A, 546B of the DID management module 540A, 540B. Various visualizations may be implemented to provide users visual cues of the trustworthiness of the service provider 520, indicating the potential risk involved in accepting the request from a service provider (e.g., the service provider 520 of FIG. 5A, 5B). FIGS. 7A-7D illustrate a few examples of visualizations 700A-700D for visualizing the trust score generated by the trust score generator 600 and/or the risk involved in accepting the request from a service provider. For example, FIG. 7A illustrates a simple round-cornered rectangular box showing a trust score 92. The trust score 92 and/or the background of the round-colored rectangular box may be presented in different colors, indicating the risk involved in accepting the request. For example, in some embodiments, when the score is lower than a first predetermined threshold, the score may be colored in red; when the score is higher than a second predetermined threshold, the score may be colored in green; and/or when the score is between the first threshold and the second threshold, the score may be colored in yellow.

FIG. 7B illustrates another example of a visualization 700B, including a starring visualization that uses colored stars to indicate a trust score 3.0. FIG. 7C illustrates another example of a visualization 700C, including a colored annulus of a circle, indicating a trust score 45. FIG. 7D illustrates another example of a visualization 700D, including a thermometer-like visualization 700D, indicating a trust score 78. The stars in FIG. 7B, the annulus of the circle in FIG. 7C, and the thermometer in FIG. 7D, and/or the backgrounds thereof may also be colored in different colors to indicate the risk involved in accepting the request from a service provider.

As discussed above, the metadata retriever 542A or 532A is configured to parse the DID document 532 to extract a linked domain. The DID document 532 may be a text file, or structured in any format that is readable by the trust score generator 600. FIG. 8 illustrates an example of a DID document 800 associated with DID 810, which corresponds to the DID document 210 of FIG. 2 and/or the DID document 532 of FIGS. 5A, 5B. As illustrated, the DID document 800 is structured in JavaScript Object Notation (JSON) format, including data associated with authentication 820 and data associated with service 830. Notably, the data associated with service 830 includes a linked domain associated with a URL 832 of a service endpoint. The metadata retriever 542A or 532A is configured to extract the linked domain and/or the URL 832 from data recorded in the distributed ledger 510 of the DID document 800, and retrieve metadata associated with the linked domain from the DNS 550.

FIG. 9 illustrates an example of a set of metadata 900 associated with a linked domain, which corresponds to the metadata 552 of FIG. 5A, 5B, and is obtained from a DNS (e.g., the DNS 550 of FIG. 5A or 5B). As illustrated, the set of metadata 900 includes (but is not limited to) the domain name, the domain creation date, the registrar registration expiration date, the registrant organization name, the registrant address, the registrant phone number, and registrant fax number, etc. The trust score generator 544A, 534B, 600 is configured to parse the set of metadata 900 to extract one or more values of one or more attributes associated with a linked domain.

Note, even though the above discussions were mostly based on a situation where a service provider 520 is a requesting entity that sends a request to a DID management module 540A, 540B, the principles described herein are not limited to a service provider 520 being a requesting entity. Any entity associated with a DID in a decentralized environment may be a requesting entity that sends a request to another entity associated with a DID, and any entity associated with a DID may also have a linked domain, which may be used by the trust score generator 524A, 534B, 600 to generate a trust score. For example, the requesting entity may be a newly acquainted friend of a second entity, and the requesting entity merely wants to obtain contact information from the second entity for friendship purposes. Before the second entity provides their contact information to the requesting entity, the second entity's DID may generate a trust score, telling the second entity whether the requesting entity is who they say they are.

The following discussion now refers to a number of methods and method acts that may be performed. Although the method acts may be discussed in a certain order or illustrated in a flow chart as occurring in a particular order, no particular ordering is required unless specifically stated or required because an act is dependent on another act being completed prior to the act being performed.

Figure 10:
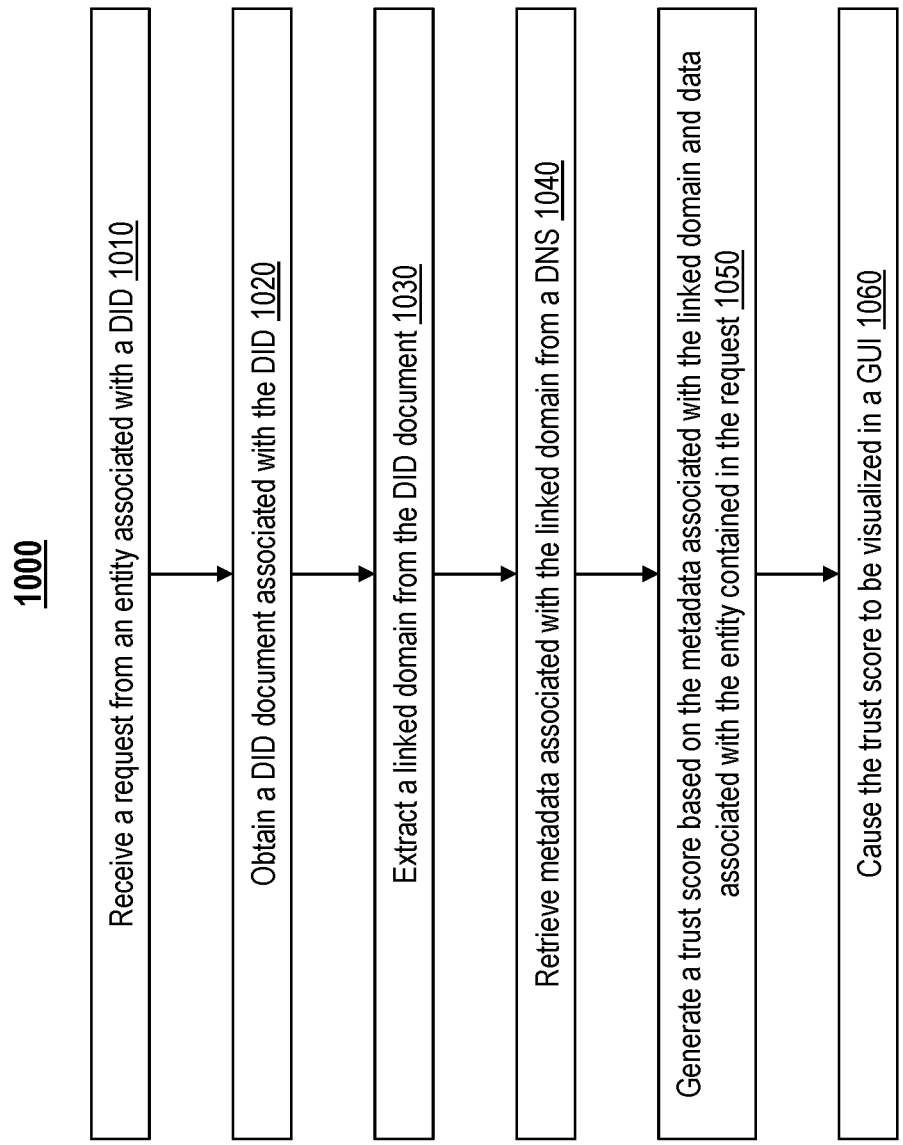
FIG. 10 illustrates a flowchart of an example of a method for bootstrapping trust in a DID.

FIG. 10 illustrates a flowchart of an example of a method 1000 for bootstrapping trust in a DID. The method 1000 may be performed by a DID management module (e.g., the DID management module 540A), a DID resolver (e.g., the DID resolver 530B), and/or a combination thereof. The method 1000 includes receiving a request from an entity associated with a DID (act 1010). The request includes the DID and data associated with the DID. The method 1000 also includes obtaining a DID document associated with the DID (act 1020). When the method is performed by a DID management module, the DID document is obtained from a DID resolver, which traverses a distributed ledger to obtain data associated with the DID and generate the DID document. When the method is performed by a DID resolver, the same DID resolver traverses a distributed ledger itself to obtain data associated with the DID and generates the DID document.

The method also includes extracting a linked domain from the DID document (act 1030) and retrieve metadata associated with the linked domain from a DNS (act 1040). A trust score is then generated based on the metadata associated with the linked domain and the data associated with the DID contained in the request (act 1050). In some embodiments, the trust score is further caused to be visualized in a GUI (act 1060).

Figure 11:
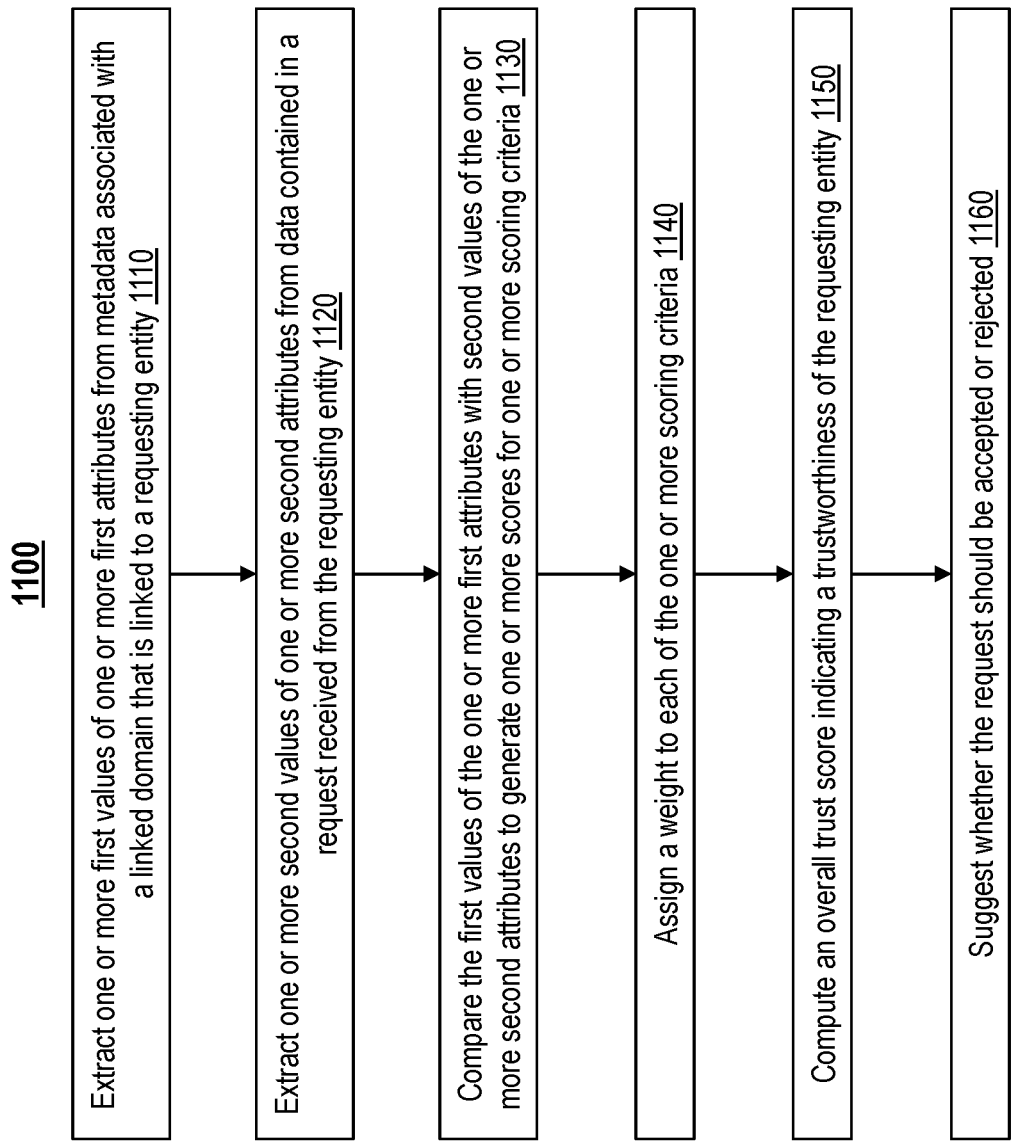
FIG. 11 illustrates a flowchart of an example of a method for generating a trust score based on metadata associated with a linked domain.

FIG. 11 illustrates a flowchart of an example of a method 1100 for generating a trust score or a suggestion, which corresponds to act 1050 of FIG. 10. The method 1100 may be performed at the trust score generator 544A of FIG. 5A, or the trust score generator 534B of FIG. 5B. The method 1100 includes extracting one or more first values of one or more first attributes from metadata associated with a linked domain that is linked to a requesting entity (act 1110). The method 1100 also includes extracting one or more second values of one or more second attributes from data contained in a request received from the requesting entity (act 1120). The first values of the one or more first attributes and the second values of the one or more second attributes are then compared with each other to generate one or more scores for one or more scoring criteria (act 1130).

In some embodiments, the method 1100 also includes assigning a weight to each of the one or more scoring criteria (act 1140) and computing an overall trust score indicating the trustworthiness of the requesting entity (act 1150). In some embodiments, the method 1100 also includes suggesting whether the request should be accepted or rejected based on the overall trust score (act 1160). In some embodiments, when the overall trust score is lower than a first threshold, the request is suggested to be rejected; when the overall trust score is greater than a second threshold, the request is suggested to be accepted; and/or when the request is between the first threshold and the second threshold, the request is suggested to be manually reviewed.

In some embodiments, the first threshold and/or the second threshold is determined based on one or more characters of the request, including (but not limited to) a type of data requested by the request and/or a type of service provided by the entity. For example, when sensitive information is requested by the service provider, the first predetermined threshold and/or the second predetermined threshold are increased, such that a greater range of score is automatically rejected, and/or a smaller range of score is automatically accepted. As another example, if the service provided by the service provider is a free social media service, the first predetermined threshold and/or the second predetermined threshold may be decreased, such that a smaller range of score is automatically rejected, and a greater range of score is automatically accepted. On the other hand, if the service provided by the service provider is an expensive and critical service, higher trustworthiness may be required.

For the processes and methods disclosed herein, the operations performed in the processes and methods may be implemented in differing order. Furthermore, the outlined operations are only provided as examples, and some of the operations may be optional, combined into fewer steps and operations, supplemented with further operations, or expanded into additional operations without detracting from the essence of the disclosed embodiments.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computing system comprising:
   one or more processors; and
   one or more computer-readable hardware storage devices having thereon computer-executable instructions that are structured such that, when the computer-executable instructions are executed by the one or more processors, the computer-executable instructions configure the computing system to at least:

receive a request from an entity associated with a decentralized identifier (DID) in a decentralized system, the request containing the DID and data associated with the DID, and the decentralized system using one or more distributed ledgers to authenticate or authorize transactions associated with DIDs;

obtain a DID document associated with the DID, the DID document containing data associated with the DID that is recorded on the distributed ledger;

extract a linked domain that is linked to the DID from the DID document;

retrieve metadata associated with the linked domain from a domain name system (DNS); and generate a trust score indicating trustworthiness of the DID associated with the entity based on the metadata associated with the linked domain and the data associated with the DID contained in the request.

2. The computing system of claim 1, the computing system further configured to:

visualize the trust score in a graphical user interface.

3. The computing system of claim 1, the computing system further configured to:

recommend whether the request should be accepted or rejected based on the trust score; or automatically accept or reject the request based on the trust score.

4. The computing system of claim 3, the computing system further configured to:

automatically accept the request when the trust score is greater than a first threshold; or automatically reject the request when the trust score is lower than a second threshold that is higher than the first threshold.

5. The computing system of claim 4, the computing system further configured to:

when the trust score is between the first threshold and the second threshold, generate a notification, notifying a user of the trust score; or request the user to manually select whether the request is to be accepted or rejected.

6. The computing system of claim 1, wherein recommending whether the request should be accepted or rejected, or automatically accepting or rejecting the request is further based on one or more characters of the request, the one or more characters of the request comprising (1) a type of data requested by the request, or (2) a type of service that the entity is to provide.

7. The computing system of claim 1, generating the trust score comprising:

extracting one or more first values of one or more first attributes from metadata associated with the linked domain;

extracting one or more second values of one or more second attributes from data associated with the request; and comparing the one or more first values of the one or more first attributes with the one or more second values of the one or more second attributes to determine one or more scores for one or more scoring criteria.

8. The computing system of claim 7, generating the trust score further comprising:

assigning a weight for each of the one or more scoring criteria; and computing an overall trust score based on weighted one or more scores for the one or more scoring criteria.

9. The computing system of claim 7, wherein the one or more first attributes include at least one of (1) creation date of the linked domain, (2) an organization name of a registrant of the linked domain, (3) an address of the registrant of the linked domain, (4) a phone number of the registrant of the linked domain, or (5) a fax number of the registrant of the linked domain.

10. The computing system of claim 7, wherein the one or more second attributes include at least one of (1) a name of the entity, (2) an address of the entity, (3) a phone number of the entity, (4) a fax number of the entity, (5) an email address of the entity, or (6) a creation date of the DID associated with the entity.

11. The computing system of claim 1, wherein:

the DID associated with the entity is a first DID;

the computing system is associated with a second DID, or a user of the computing system is associated with a second DID; and obtaining the DID document comprising:

sending the first DID associated with the entity to a DID resolver, causing the DID resolver to access a distributed ledger to obtain data associated with the first DID and resolve the first DID to generate the DID document; and receiving the DID document from the DID resolver.

12. The computing system of claim 1, wherein the computing system is further caused to:

access a distributed ledger to obtain data associated with the DID; and resolve the DID based on the data associated with the DID to generate the DID document.

13. A method for bootstrapping a trust score in a decentralized identifier, the method comprising:

receiving a request from an entity associated with a decentralized identifier (DID) in a decentralized system, the request containing the DID and data associated with the DID, and the decentralized system using one or more distributed ledgers to authenticate or authorize transactions associated with DIDs;

obtaining a DID document associated with the DID, the DID document containing data associated with the DID that is recorded on the distributed ledger;

extracting a linked domain that is linked to the DID from the DID document;

retrieving metadata associated with the linked domain from a domain name system (DNS); and generating a trust score indicating trustworthiness of the DID associated with the DID based on the metadata associated with the linked domain and the data associated with the DID contained in the request.

14. The method of claim 13, further comprising:

visualizing the trust score in a graphical user interface.

15. The method of claim 13, further comprising:

recommending whether the request should be accepted or rejected based on the trust score; or automatically accepting or rejecting the request based on the trust score.

16. The method of claim 15, further comprising:

automatically accepting the request when the trust score is greater than a first threshold;

automatically rejecting the request when the trust score is lower than a second threshold; or when the trust score is between the first threshold and the second threshold, generating a notification, notifying a user of the trust score; or requesting the user to manually select whether the request is to be accepted or rejected.

17. The method of claim 13, wherein recommending whether the request should be granted, or automatically accepting or rejecting the request is further based on one or more characters of the request, the one or more characters of the request comprising (1) a type of data requested by the request, or (2) a type of service that the entity is to provide.

18. The method of claim 13, generating the trust score comprising:
- extracting one or more first values of one or more first attributes from metadata associated with the linked domain;
- extracting one or more second values of one or more second attributes from data associated with the request; and
- comparing the one or more first values of the one or more first attributes with the one or more second values of the one or more second attributes to determine one or more scores for one or more scoring criteria.

19. The method of claim 18, generating the trust score further comprising:
- assigning a weight for each of the one or more scoring criteria; and
- computing an overall trust score based on weighted one or more scores for the one or more scoring criteria.

20. A computer program product comprising one or more hardware storage devices having stored thereon computer-executable instructions that are structured such that, when the computer-executable instructions are executed by one or more processors of a computing system, the computer-executable instructions configure the computing system to at least:
- receive a request from an entity associated with a decentralized identifier (DID) in a decentralized system, the request containing the DID and data associated with the DID, and the decentralized system using one or more distributed ledgers to authenticate or authorize transactions associated with DIDs;
- obtain a DID document associated with the DID, the DID document containing data associated with the DID that is recorded on the distributed ledger;
- extract a linked domain that is linked to the DID from the DID document;
- retrieve metadata associated with the linked domain from a domain name system (DNS); and
- generate a trust score indicating trustworthiness of the DID associated with the DID based on the metadata associated with the linked domain and the data associated with the DID contained in the request.

* * * * *